United States Patent [19]
Takimoto et al.

[11] Patent Number: 5,461,605
[45] Date of Patent: Oct. 24, 1995

[54] INFORMATION RECORDING REPRODUCING METHOD RECORDING CARRIER AND APPARATUS FOR RECORDING AND/OR REPRODUCING INFORMATION ON INFORMATION RECORDING CARRIER BY USE OF PROBE ELECTRODE, INFORMATION RECORDING/REPRODUCING APPARATUS EXECUTING THE METHOD, AND INFORMATION RECORDING CARRIER SUITABLE

[75] Inventors: Kiyoshi Takimoto, Isehara; Toshihiko Miyazaki, Hiratsuka; Kunihiro Sakai, Isehara; Ryo Kuroda, Machida, all of Japan

[73] Assignee: Canon Kabushiki Kaisha, Tokyo, Japan

[21] Appl. No.: 381,289

[22] Filed: Jan. 31, 1995

Related U.S. Application Data

[63] Continuation of Ser. No. 913,342, Jul. 15, 1992, abandoned.

[30] Foreign Application Priority Data

| Jul. 17, 1991 | [JP] | Japan | 3-176794 |
| Aug. 2, 1991 | [JP] | Japan | 3-194124 |
| Aug. 2, 1991 | [JP] | Japan | 3-194126 |
| Aug. 2, 1991 | [JP] | Japan | 3-194127 |
| Jan. 22, 1992 | [JP] | Japan | 4-009282 |

[51] Int. Cl.⁶ .............. G11B 9/00; G01B 9/00; G01B 7/00
[52] U.S. Cl. .............. 369/126; 369/124; 369/127; 369/128; 369/130; 369/13; 369/44.31; 250/306; 250/310; 360/55; 360/62
[58] Field of Search .............. 250/306, 307, 250/310; 369/126, 275.1, 101, 124, 127, 128, 130, 13, 44.31; 73/105; 360/55, 62

[56] References Cited

U.S. PATENT DOCUMENTS

| 4,575,834 | 3/1986 | Huck | 369/126 |
| 5,015,850 | 8/1991 | Zdeblick et al. | 369/101 |
| 5,132,533 | 7/1992 | Kawase et al. | 250/306 |
| 5,155,715 | 10/1992 | Ueyema et al. | 250/307 |
| 5,166,520 | 11/1992 | Prater et al. | 250/307 |
| 5,187,367 | 2/1993 | Miyazaki et al. | 250/306 |
| 5,305,294 | 4/1994 | Kime et al. | 369/13 |

FOREIGN PATENT DOCUMENTS

| 63-096956 | 4/1988 | Japan |
| 63-161552 | 7/1988 | Japan |
| 63-161553 | 7/1988 | Japan |
| 1312753 | 12/1989 | Japan |

OTHER PUBLICATIONS

Proceedings of the IEEE, Petersen, "Silicon as a Mechanical Material", vol. 70, No. 5, pp. 420–457, May 1982.
Physical Review Letters, Binnig et al., "Surface Studies by Scanning Tunneling Microscopy", vol. 49, No. 1, pp. 57–60, Jul. 5, 1982.

(List continued on next page.)

*Primary Examiner*—Viet Q. Nguyen
*Attorney, Agent, or Firm*—Fitzpatrick, Cella, Harper & Scinto

[57] ABSTRACT

An information recording/reproducing method and apparatus is for carrying out at least one of recording and reproducing information through a probe electrode or through a plurality of probe electrodes on an information recording medium. A probe electrode is disposed on an elastic member. A relative position is so adjusted between the recording medium and the probe electrode that a repulsive force between them is comparative to an elastic force of the elastic member. In case of plural probe electrodes, they are displaced to keep an equal spacing between the recording medium and the respective probe electrodes so that they may have either a zero average or a minimized square sum of displacement. A spacer layer will do for setting a spacing between a probe electrode and the recording medium.

4 Claims, 22 Drawing Sheets

OTHER PUBLICATIONS

Helvetica Physica Acta, Binnig et al., "Scanning tunneling microscopy", vol. 55, No. 6, pp. 726–735, May 9, 1983.

Physical Review Letters, Binnig et al., "Atomic Force Microscope", vol. 56, No. 9, pp. 930–933, Mar. 3, 1986.

Applied Physics Letters, Staufer et al., "Nanometer scale structure fabrication with the scanning tunneling microscope" vol. 51, No. 4, pp. 244–246, Jul. 27, 1987.

Applied Physics Letters, Albrecht et al., "Nanometer-scale hole formation on graphite using a scanning tunneling microscope", vol. 55, No. 17, pp. 1727–1729, Oct. 23, 1989.

29 ROTATING DIRECTION

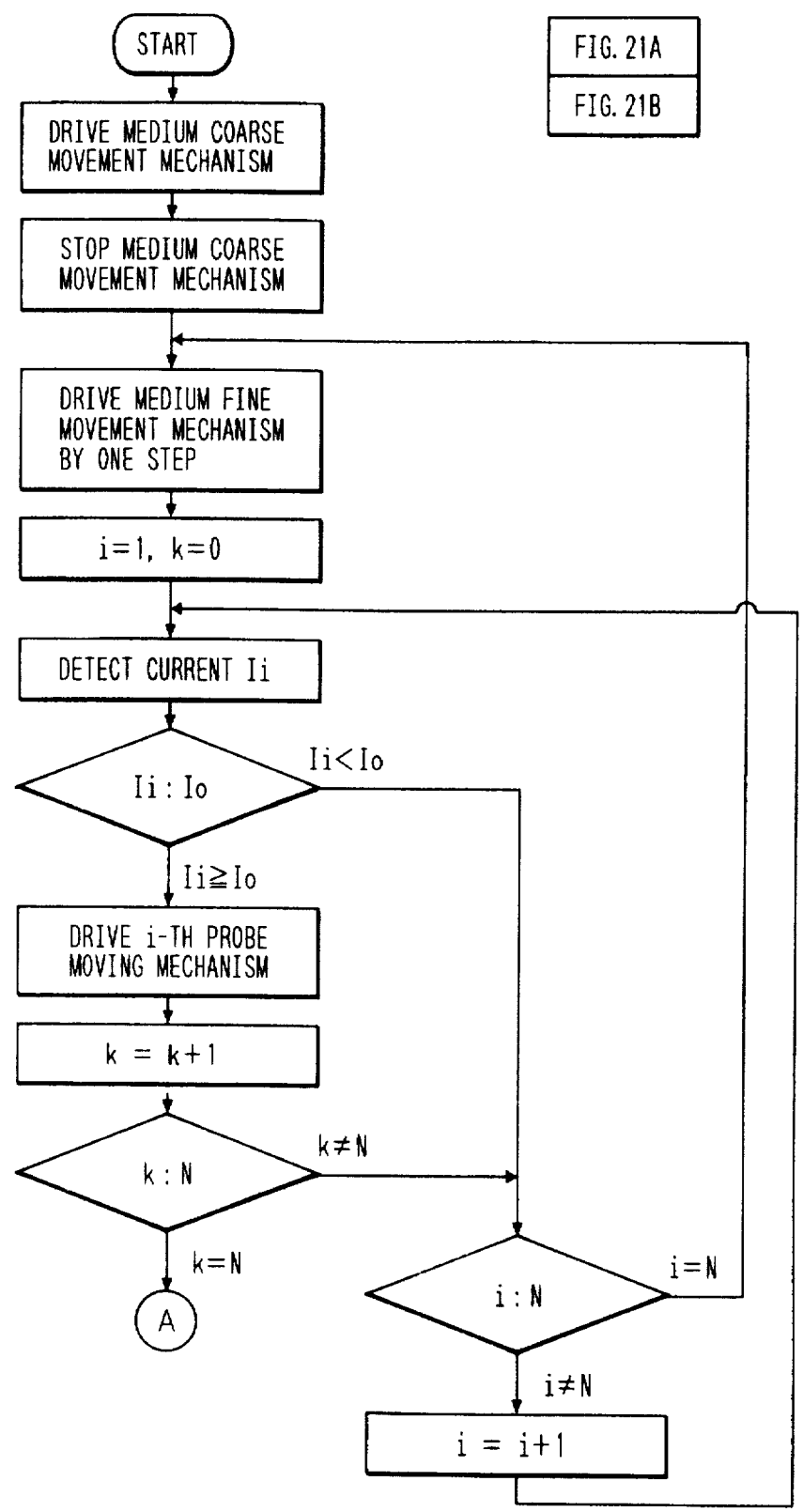

*: FIRST BIT

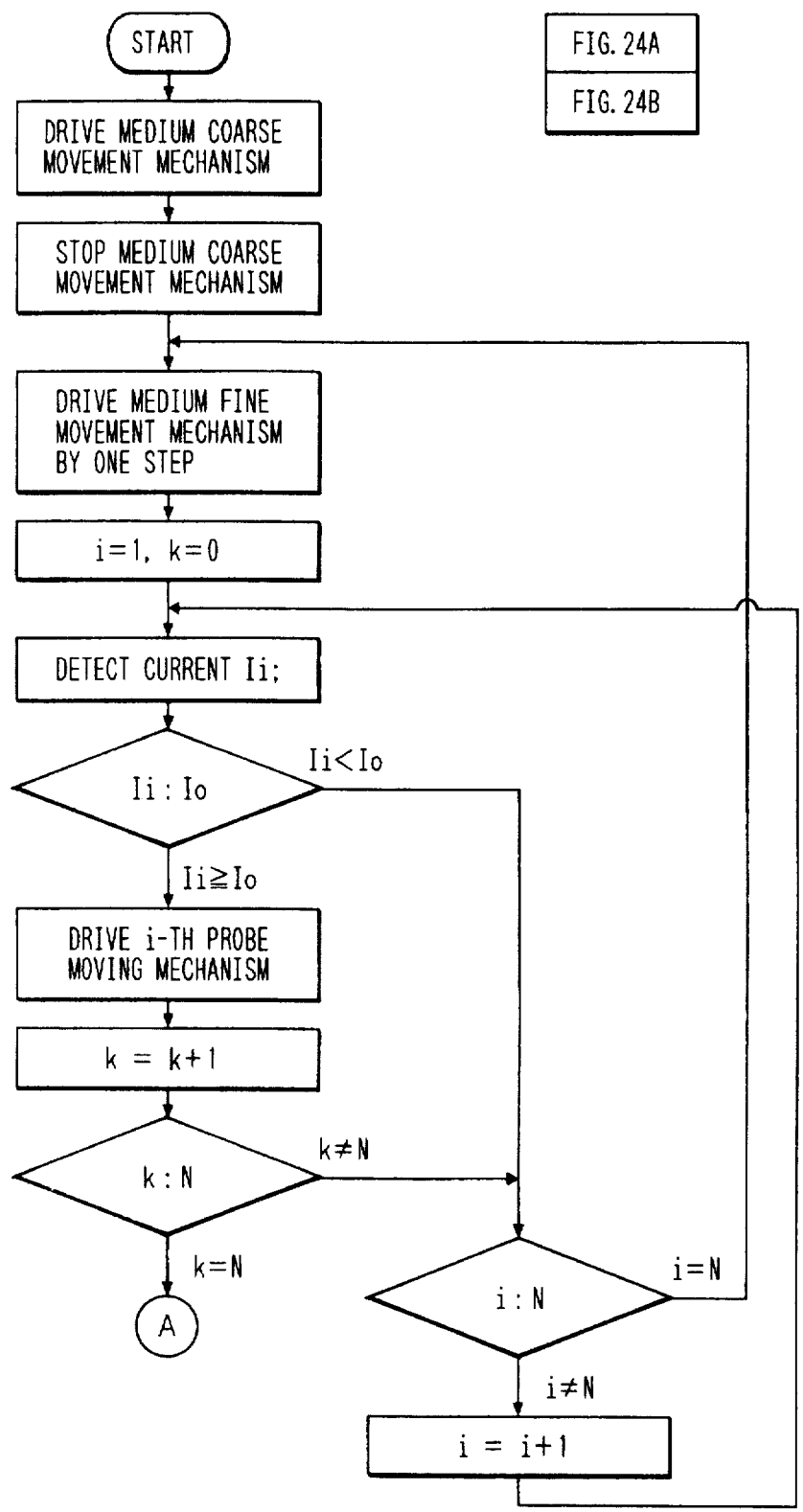

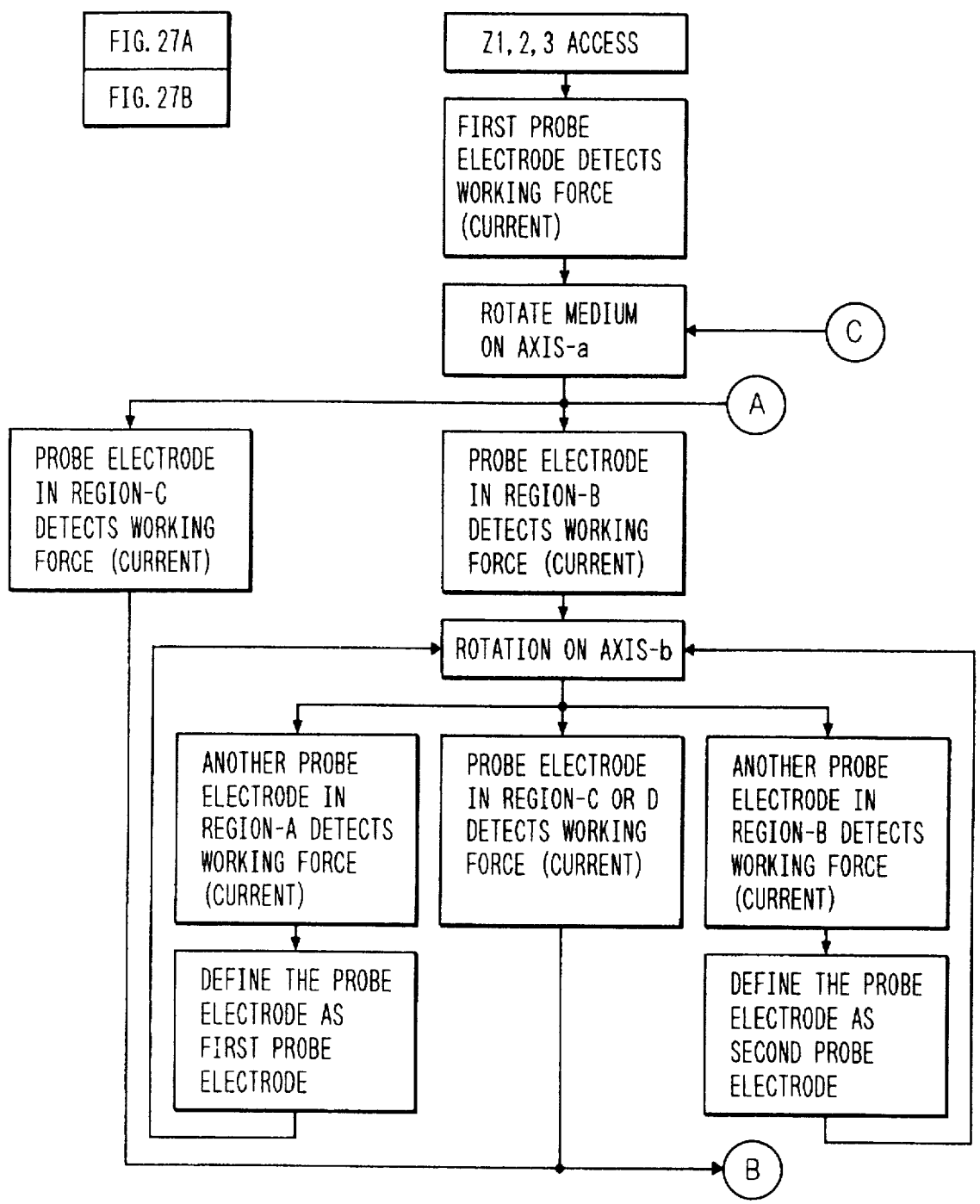

INFORMATION RECORDING REPRODUCING METHOD FOR RECORDING AND/OR REPRODUCING INFORMATION ON INFORMATION RECORDING CARRIER BY USE OF PROBE ELECTRODE, RECORDING CARRIER AND APPARATUS

This application is a continuation of application Ser. No. 07/913,342 filed Jul. 15, 1992, now abandoned.

BACKGROUND OF THE INVENTION

1. Field of the Invention

The present invention relates to a method and apparatus for recording and/or reproducing information in a high density and with a large capacity using a probe electrode, and to an information recording carrier suitable for use in the method.

2. Related Background Art

Recent applications of memory elements and memory systems are diverse to computers and associate instruments, video disks, digital audio disks, etc., forming a core of electronics industries. Conventionally leading memories were magnetic memories and semiconductor memories. There have been, however, appearing optical memory elements using inexpensive, high density recording medium with recent progress of laser technology. It is highly desired to embody a memory device or method with a large capacity, but in a small volume for future development of computer utility at home and of information industry directed to images.

Meanwhile, a scanning tunnel microscope as referred to as STM has recently been developed which can directly observe an electronic structure of surface atoms of a conductor (G. Binnig et al., Helvetica Physica Acta., 55. 726 (1982)). The STM allows one to observe a single crystal and an amorphous substance in a real space with a high resolving power. The STM uses such a principle that a tunnel current flows when a metal probe approaches a conductive material up to a distance of about 1 nm with application of voltage between them. The tunnel current is very sensitive to a change in distance between them. Then, manipulating the probe to maintain the tunnel current constant, one can obtain an image of surface of real space. The observation with the STM has been limited to conductive materials, but has already been started applying to an analysis of structure of a thin insulating film formed on a surface of conductive material. Further, since the STM uses a micro current for detection, it is advantageous in observation without any damage on a material to be observed and with a low power. Also, the STM can be operated in air or in solution as well as in ultra high vacuum, and therefore is applicable to various materials, with an expectation to broaden its applications.

Another application of the STM is an Atomic Force Microscope as referred to as AFM (G. Binnig et al., Phys. Rev. Lett., 56, 930 (1985)). The AFM also allows one to obtain information about unevenness of surface as does the STM. Since the AFM can measure an insulating specimen on an order of an atom, further development is expected in future.

Recently, there have been proposed apparatuses applying the principles of the STM and AFM such as a recording apparatus for writing information with high resolving power and reproducing apparatus for reading out the recorded information with high resolving power. In the apparatus applying the STM and AFM technology, since it is necessary to control a distance between the probe electrode and the recording medium up to about 1 nm, the technology for controlling the distance with precision is required.

In the prior art to apply the principle of the STM and AFM, it was required to provide complicated control circuit and mechanism for controlling the distance between the probe electrode and the surface of the recording medium with order of nm. Further, in case of providing a plurality of probe electrodes for the sake of improvement of the recording and reproducing processing, preferable technology for controlling the distance between each electrode and the surface of the recording medium was required.

SUMMARY OF THE INVENTION

It is an object of the preset invention, taking the above-described problems into consideration, to provide an information recording/reproducing method which does not require a complex spacing control circuit and mechanism and which is capable of properly controlling a spacing with a plurality of probes, to provide an apparatus executing the method, and to provide an information recording carrier suitable for use in the method.

The above object of the present invention can be achieved by an information recording/reproducing apparatus which can carry out at least one of recording and reproducing information through a probe electrode on an information recording medium, comprising: a probe electrode; an elastic member for supporting the probe electrode; and adjusting means for adjusting a relative position between the medium and the probe electrode; wherein the adjusting means adjusts the relative position between the medium and the probe electrode such that a repulsive force acting between the medium and the probe electrode is made comparable to an elastic force of the elastic member.

The object can also be achieved by an information recording/reproducing apparatus which can carry out at least one of recording and reproducing information through a plurality of probe electrodes on an information recording medium, comprising: a plurality of probe electrodes for recording and reproducing information; support means for unitedly supporting the plurality of probe electrodes in parallel facing the medium; adjusting means for adjusting a spacing between the medium and the support means; displacing means for, in order to independently adjust a spacing between the medium and each tip of the probe electrodes, independently displacing the respective probe electrodes in a direction of the spacing; and control means for controlling the displacing means such that all spacings between the medium and the respective probe electrode tips are made equivalent, and for controlling the adjusting means such that, upon the control of the displacing means, an average of displacement amounts of the plural probe electrodes is substantially zero.

The object can also be achieved by an information recording/reproducing apparatus which can carry out at least one of recording and reproducing information through a plurality of probe electrodes on an information recording medium, comprising: a plurality of probe electrodes for recording and reproducing information; support means for unitedly supporting the plurality of probe electrodes in parallel facing the medium; adjusting means for adjusting a spacing between the medium and the support means; displacing means for, in order to independently adjusting a spacing between the medium and each tip of the probe electrodes, independently displacing the respective probe electrodes in a direction of the spacing; and control means for controlling the displacing means such that all spacings between the medium and the respective probe electrode tips are made equivalent, and for controlling the adjusting means such that, upon the control of the displacing means, a sum of squares of displacement amounts of the plural probe electrodes is minimized.

The object can further be achieved by an information recording/reproducing apparatus which can carry out at least one of recording and reproducing information through a probe electrode on an information recording medium, comprising: a probe electrode; and a spacing setting member disposed between the probe electrode and the medium to set a spacing between the probe electrode and the medium.

The object can further be achieved by an information recording medium for use in an information recording/reproducing apparatus which can carry out at least one of recording and reproducing information using a probe electrode, comprising: a recording layer; and a spacing setting layer disposed on the recording layer to set a spacing between the probe electrode and the recording layer.

The object can further be achieved by an information recording/reproducing method for carrying out at least one of recording and reproducing information through a probe electrode on an information recording medium, comprising: a step of recording and/or reproducing information through the probe electrode on a recording layer of the information recording medium while sandwiching a spacing setting member for setting a recording layer-to-probe electrode spacing between the recording layer and the probe electrode.

The object can further be achieved by an information recording/reproducing method for carrying out at least one of recording and reproducing information on an information recording medium through a plurality of probe electrodes unitedly supported by a support member, comprising: an adjusting step of adjusting a spacing between the medium and the support member; a displacing step of independently displacing, in order to independently adjust a spacing between the medium and each tip of the probe electrodes, the respective probe electrodes in a direction of the spacing; and a controlling step of controlling the displacement such that all spacings between the medium and the respective probe electrode tips are made equivalent, and of controlling the adjusting means such that, upon the control of the displacement, an average of displacement amounts of the plural probe electrodes is substantially zero.

The object can further be achieved by an information recording/reproducing method for carrying out at least one of recording and reproducing information on an information recording medium through a plurality of probe electrodes unitedly supported by a support member, comprising: an adjusting step of adjusting a spacing between the medium and the support member; a displacing step of independently displacing, in order to independently adjust a spacing between the medium and each tip of the probe electrodes, the respective probe electrodes in a direction of the spacing; and a controlling step of controlling the displacement such that all spacings between the medium and the respective probe electrode tips are made equivalent, and of controlling the adjusting means such that, upon the control of the displacement, a sum of squares of displacement amounts of the plural probe electrodes is minimized.

DETAILED DESCRIPTION OF THE PREFERRED EMBODIMENTS

First, second, and third embodiments will be first below explained, in which an elastic member supports a probe electrode and in which a repulsive force acting between a probe electrode and a recording medium is balanced with a spring force caused by deformation of elastic member. The elastic member may be arranged for example such that a probe electrode is disposed on a center of a bridge beam (both-side-supported beam) or on a free end of a cantilever beam. The beam may be made preferably of a leaf of Au, Ni, SuS, or BeCuP. To make a further smaller beam, a thin film of $SiO_2$, which is often used in micromechanics, may be employed.

Since the force acting between the probe electrode and the recording medium is extremely small, the probe electrode and the elastic support should desirably have as small masses as possible, respectively. The elastic support should be flexible to facilitate its change, but be desirably tough against external vibrations.

A distance between the probe electrode and the recording medium is reduced to obtain an action of repulsive force between them. In that state, the probe electrode is scanned over a surface of the recording medium and a desired voltage is applied between them by a voltage application circuit to effect recording, reproducing, and erasing.

A tip of the probe electrode is preferably sharp-pointed to increase a resolving power of recording, reproducing, and erasing. A probe used in the present invention is one that was produced by implantation of Si onto a $SiO_2$ substrate with a focussed ion beam, then by selective crystallization of Si over the implanted Si, and finally by conductivity treatment of vapor deposition of Au thereon. The formation and the processing method of probe are not limited only to those used in the present invention.

A fundamental recording medium used in the present invention may be any medium which can change its state of conductivity by voltage application and can maintain the changed conductivity state without continuation of voltage application. Specifically preferable recording media are those made of organic materials having groups with π-electron level, as disclosed in Japanese Patent Application Laid-open Nos. 63-161552 and 63-161553. More preferably, the recording medium may be a monomolecular built-up film of either of the above-mentioned organic materials formed by the Langmuir-Blodgett technique as will be referred to as LB technique.

Figure 7:
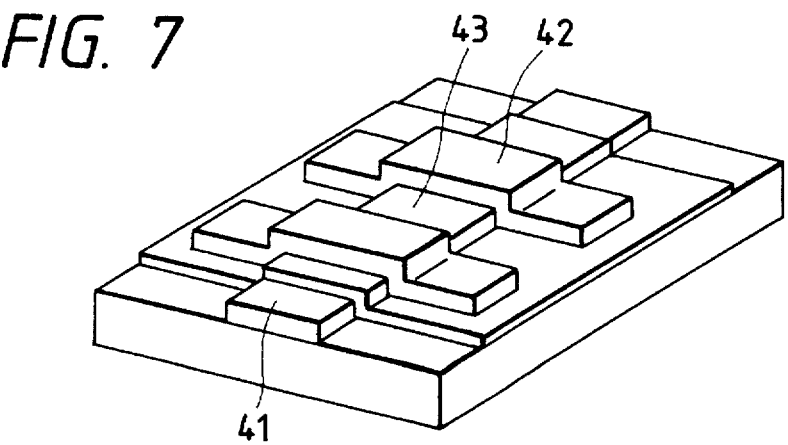
FIG. 7 is a structural scheme of MIM element used in the first and the second embodiments in which a recording layer is sandwiched between metal electrodes.
Figure 8:
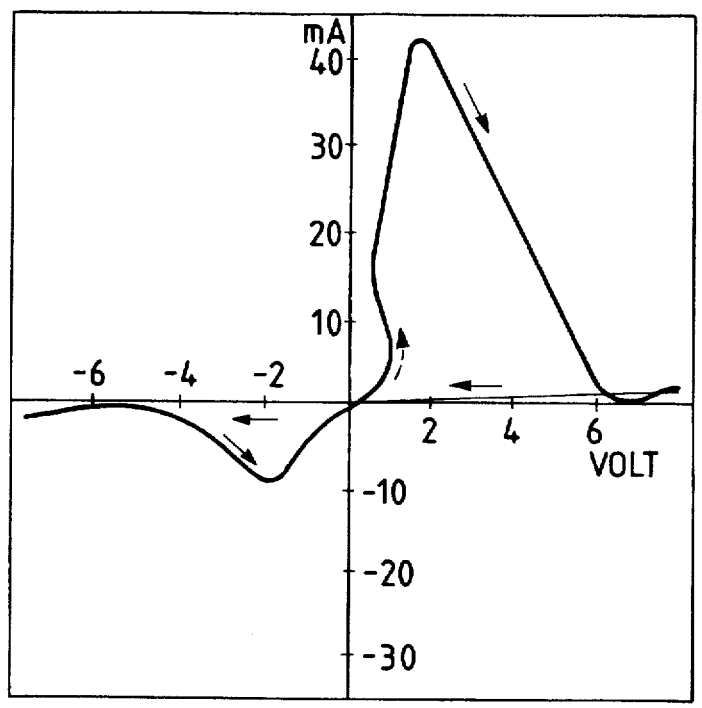
FIG. 8 shows current-voltage characteristics obtained from the element of FIG. 7.
Figure 9:
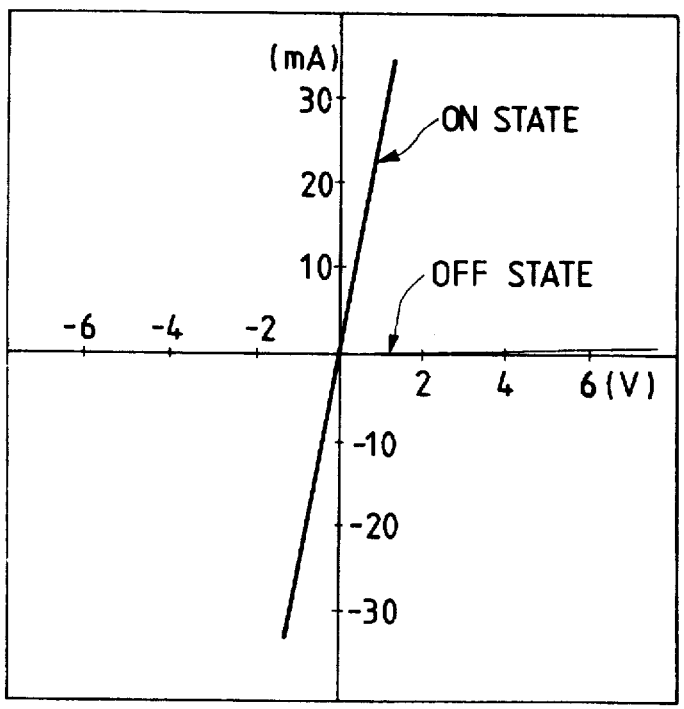
FIG. 9 shows current-voltage characteristics to show a memory effect obtained from the element of FIG. 7.

An MIM structure element, in which a monomolecular built-up film 43 as described above is sandwiched between metal electrodes 41, 42 as shown in FIG. 7, has current-voltage characteristics as shown in FIGS. 8 and 9 (see Japanese Patent Application Laid-open No. 63-96956).

Application of a voltage over a threshold level changes a state of conductivity between two states, which are an ON state and an OFF state, and the respective states are held with a voltage below the threshold level. Such characteristics appear in a recording medium with a film thickness of several to several thousands of angstroms. A film thickness of several to five hundreds of angstroms, as disclosed in Japanese Patent Application Laid-open Nos. 63-161552 and 63-161553, is preferable as a recording medium in embodiments of the present invention as detailed below. Most preferably, the film thickness is between 10 and 200 angstroms.

Materials for electrodes used in the below-described embodiments may be those having a high conductivity, for example, metals such as Au, Pt, Ag, Pd, Al, In, Sn, Pb, W, etc., alloys thereof, graphites, sillcides, conductive oxides such as ITO, and so on. Conventionally known thin film formation techniques may be well applied to a method for forming the electrode using such materials. A preferable material for electrode directly formed on a substrate is a conductive material which does not form an insulating oxide film on a surface thereof upon formation of LB film, for example, precious metals and oxides such as ITO.

A metal electrode of recording medium may be preferably used when a recording layer has a high insulating property. If a metal layer has a semiconductive property with resistance below MΩ, use of metal electrode is not always required.

There is below explained in detail a first embodiment of the present invention with reference to the accompanying drawings.

Figure 1:
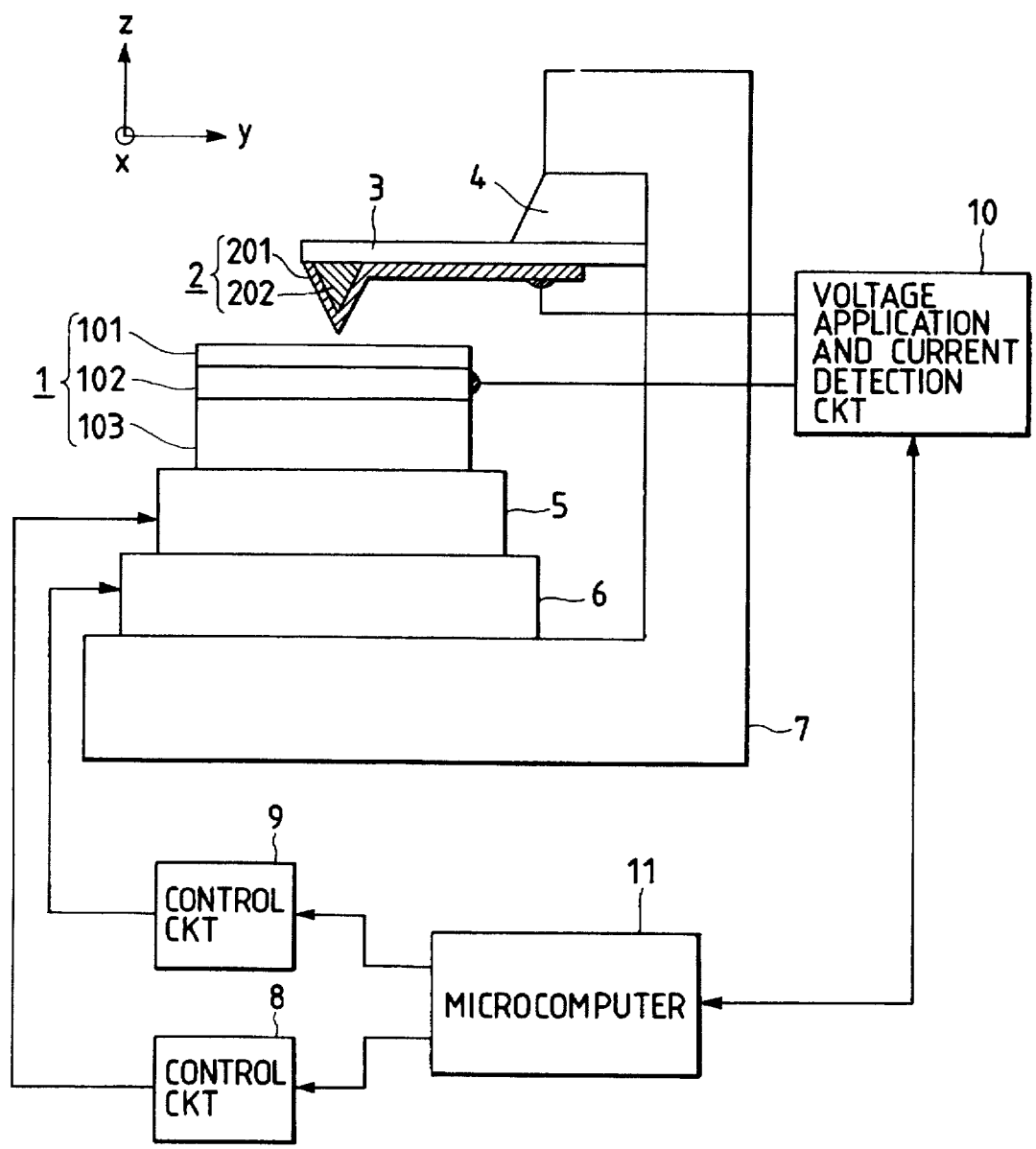
FIG. 1 is a drawing to show a first embodiment of an information recording/reproducing apparatus according to the present invention.

FIG. 1 is a block structural drawing to show an information recording/reproducing apparatus in the first embodiment. Referential numeral 1 denotes a recording medium, 2 a probe electrode provided to face the recording medium 1, 3 a cantilever beam to which the probe electrode 2 is attached, and 4 a support of the cantilever beam 3. The probe electrode 2 may displace through the cantilever beam 3 in the z-direction as shown in FIG. 1. The medium 1 may be finely moved by an xyz fine aligner 5 in the x-, y-, and z-directions, and further coarsely moved by an xyz coarse aligner 6. The support 4 of the cantilever beam and the xyz coarse aligner 6 are fixed on a base 7. The base 7 is disposed on an anti-vibration table, though not shown in FIG. 1.

The cantilever beam 3 is produced using the etching technique of silicon. A cantilever beam of $SiO_2$ is formed in length of 100 μm, in width of 20 μm, and in thickness of 1 μm in the anisotropic etching technique highly using the properties of silicon crystal. This technique is well known (K. E. Petersen, Proc. IEEE 70, 420 (1982)). The probe electrode 2 was produced by implanting Si ions into an end of the cantilever 3 of $SiO_2$ produced in the anisotropic etching method, by letting Si crystal selectively growing on the implanted Si to form a crystal 202 of pin-pointed pyramid, and by depositing Au on the crystal 202 in thickness of 300 angstroms in the vacuum deposition method to form a conductive layer 201. A cylindrical piezo-electric device is used in the xyz fine aligner 5, through which the recording medium 1 may be finely adjusted in the x-, y-, and z-directions by applying a voltage thereto.

The xyz coarse aligner 6 employs an xyz stage.

The probe electrode 2 and a foundation electrode 102 of the recording medium 1 are connected to a voltage application and current detection circuit 10, which is composed of a voltage application circuit for applying a voltage for recording or erasing to the electrodes and of a current detection circuit for detecting a current (tunnel current) flowing between the probe electrode 2 and the recording medium 1.

The xyz fine aligner 5 and the xyz coarse aligner 6 are driven by control circuits 8, 9, respectively. These circuits and the voltage application and current detection circuit 10 are connected to a microcomputer 12, which controls the circuits.

The recording medium was produced as follows.

A glass substrate (substrate 103) was subject to optical polish, and then washed with neutral detergent and trichloroethylene. After the washing, Cr was deposited as an undercoat layer in thickness of 50 angstroms in the vapor deposition method. Further, Au was deposited in thickness of 400 angstroms in the vapor deposition method over the undercoat layer, forming a foundation electrode (Au electrode 102).

A chloroform solution in which a squarilium-bis-6-octylazulene as will be referred to as SOAZ was dissolved in a density of 0.2 mg/ml was developed over a surface of water at 20° C., to form a monomolecular film over the surface. After evaporation of the solvent to increase a surface pressure of the monomolecular film up to 20 mN/m, the above electrode substrate was dipped into the SOAZ developed water to cross the surface at a speed of 5 mm/min while keeping the surface pressure constant, and then drawn up to obtain two built-up layers of Y-type monomolecular film. This step was repeated four times to obtain the recording medium 1 having a recording layer 101 of eight built-up layers of SOAZ.

Next explained are concrete manners of recording, reproducing, and erasing.

Figure 3:
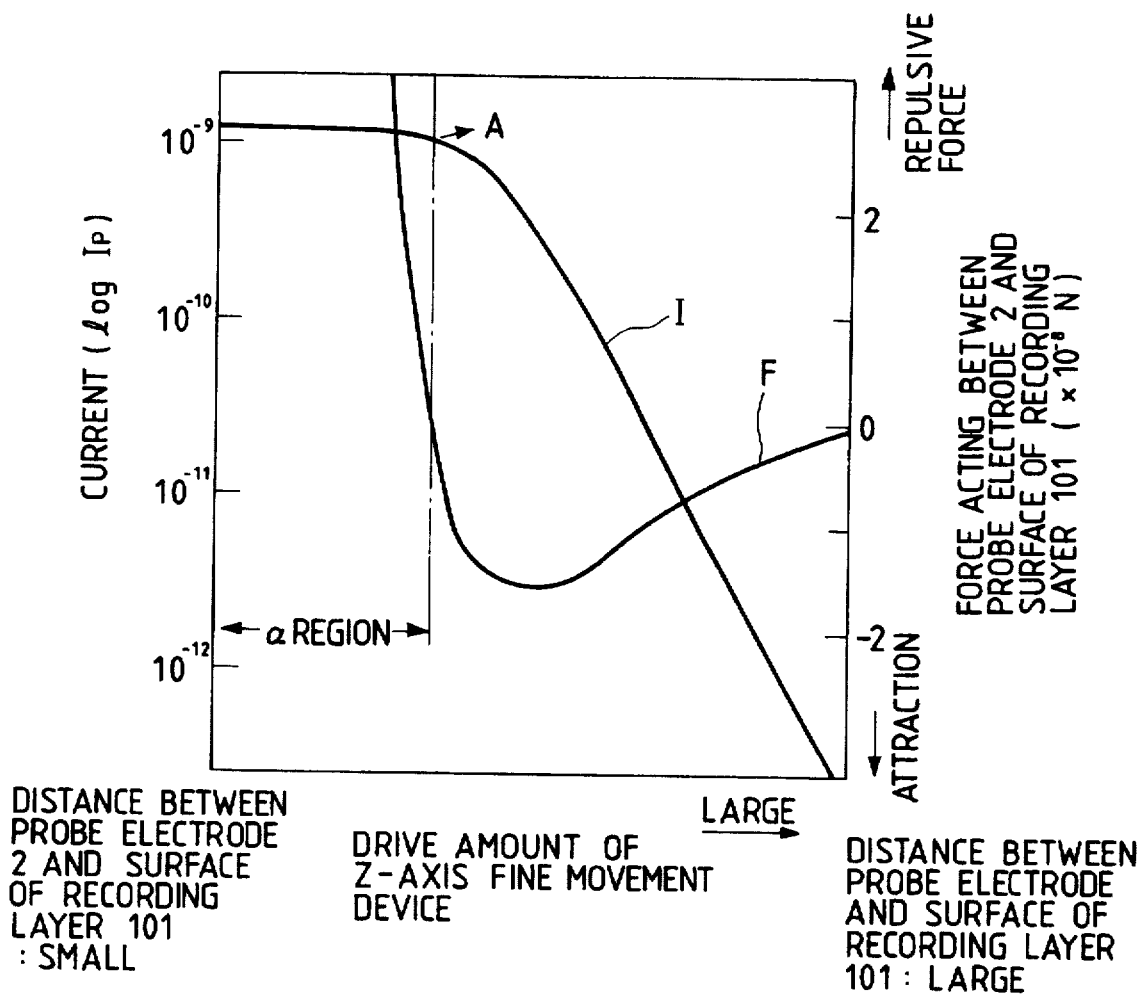
FIG. 3 is a drawing to show relations between a distance and a tunnel current flowing between a probe electrode and a medium, and between a distance and a repulsive force acting between the probe electrode and the medium.

After securing the recording medium 1 onto the xyz fine aligner 5, a bias voltage of 100 mV is applied between the probe electrode 2 and the Au electrode 102 to drive the xyz coarse aligner 6 and the xyz fine aligner 5 as to move the medium 1 towards the probe electrode 2. A curve 1 in FIG. 3 shows a relation between an electric current flowing between the probe electrode 2 and the recording medium 1, and a distance between them upon the approach of the medium 1.

While the recording medium 1 approaches the probe electrode 2, a force acts between them to deform the cantilever beam 3. A curve F in FIG. 3 shows a relation between a deformation amount and a distance between the probe electrode 2 and the recording medium 1 upon the approach.

A repulsive force acts between the probe electrode 2 and the recording medium 1 in an area α where the current is over A. As seen from FIG. 3, the current flowing between the probe electrode 2 and the recording medium 1 is constant in area α to a change in distance between them. Therefore, the following steps will be employed for the approach. A current (a value of electric current) is first detected by the circuit 10. The microcomputer 11 monitors whether the value of electric current reaches A entering the region α based on the detected current value, and controls the xyz coarse aligner 6 and the xyz fine aligner 5 before the electric current value reaches A. Further, the recording medium 1 is controlled to approach the probe electrode 2 until a repulsive force, specifically of $10^{-8}$[N], is set between the probe electrode 2 and the recording medium 1.

Once the detected electric value reaches A, the microcomputer 11 stops the control of the xyz coarse aligner 8 and the xyz fine aligner 5. Then the microcomputer 11 makes the xyz fine aligner 5 move the medium 1 in the x- and y-directions while keeping the z-directional position of the medium 1. This results in scanning the medium 1 with the probe electrode 2. For recording information, the circuit 10 applies a voltage exceeding a threshold level which turns the medium into the ON state at a predetermined position in correspondence to recording information during the scanning. The information recording is thus effected on the medium 1 thereby. For erasing, which is recording of signal of zero, a voltage over a threshold level returning the medium into the OFF state is applied in correspondence to erasing information in the same manner as upon recording. For reproducing information, while scanning with application of a voltage below the above-described threshold levels, the circuit 10 detects a current flowing between the probe electrode 2 and the medium 1. A change of detection current upon the scanning represents information recorded on the medium. The current value A is arbitrarily determined within a range where a repulsive force acts between the probe electrode and the recording medium, based on characteristics which have preliminarily been obtained before use of the apparatus as shown in FIG. 3, and taking an elastic force of probe electrode support into consideration. The thus-determined current value A is set in the microcomputer 11.

In the first embodiment as described, the tip of probe electrode and the surface of recording medium are put close to each other up to the distance where the repulsive force acts between them, the probe electrode 2 is scanned over the surface of the recording medium 1 while the support of the probe electrode is kept elastically deformed by the repulsive force, the medium changing voltage is applied for recording or erasing information during the scan between the probe electrode 2 and the recording medium 1, and a very small voltage is applied to detect a tunnel current flowing in the recording medium, whereby detecting regions different in conductivity where the tunnel current changes, that is, detecting recording bits.

Since the support of the probe electrode is used in the elastically deformed state by the repulsive force acting between the probe electrode tip and the record medium surface, in which the repulsive force is balanced with the elastic force of the support, the electrode tip may be adjusted as follows depending on unevenness of the medium surface. If the repulsive force becomes increased due to approach of the probe electrode tip to the medium surface, the deformation of the support increases to force the probe electrode tip away from the medium surface. If the repulsive force decreases due to leave of the probe electrode tip away from the medium surface, the deformation of the support also decreases to force the probe electrode tip towards the medium surface. Thus, if the deformation amount of the probe electrode support, which is caused by the unevenness of the surface during the scan, is within the elastic deformation, the distance between the probe electrode 2 and the medium surface 1 may almost be kept constant without a feedback control in use of an actuator attached to the support while monitoring the deformation amount of the support.

A very small voltage is applied between the probe electrode and the recording medium in this state, and a current signal detected upon the application of the very small voltage includes no current signal caused by the unevenness of the recording medium surface, allowing accurate reproduction of recorded bits.

The following is tests of recording, of reproducing, and of erasing information, which were conducted with this apparatus.

Figure 4:
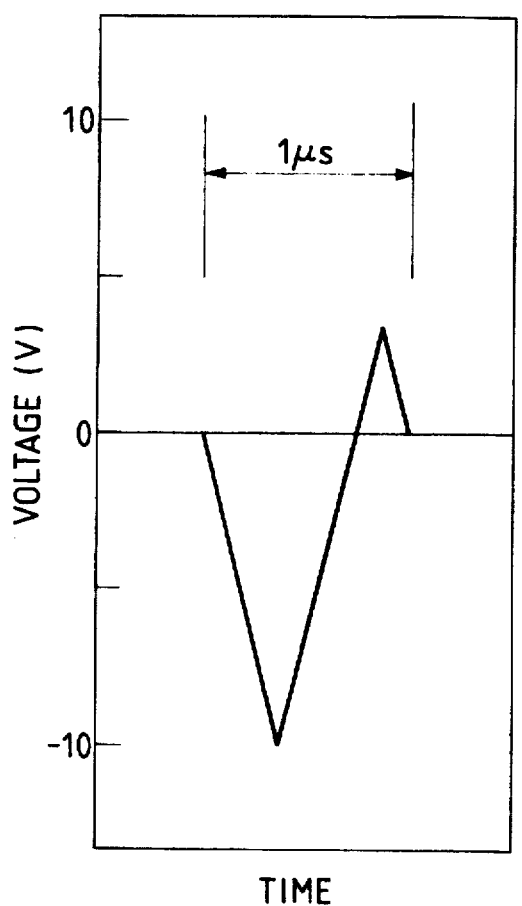
FIG. 4 is a drawing to show a pulse voltage waveform for recording.

The probe electrode 2 and the recording medium 1 were put close to each other up to the distance in the region α in FIG. 3 while monitoring the detection current. Outputs of the xyz fine aligner 5 and the xyz coarse aligner 6 were held in this state. A triangular pulse voltage, which had a waveform as shown in FIG. 4 with a voltage exceeding a threshold level voltage $V_{th\ ON}$ causing the ON state, was applied between the probe electrode 2 and the Au electrode 102. After that, a bias voltage of 100 mV was again applied between them. With the bias voltage, a current was measured. The measured current was about 8 μA, showing a change of state into the ON state.

Figure 5:
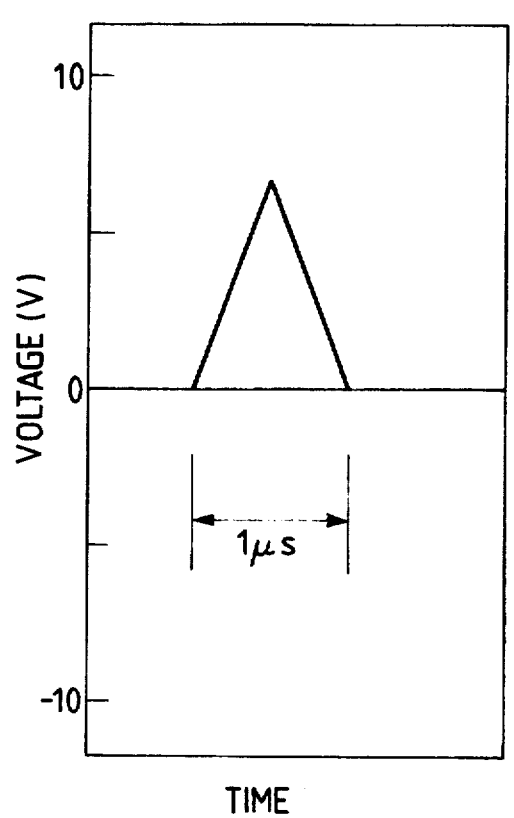
FIG. 5 is a drawing to show a pulse voltage waveform for erasing.

Then a triangular pulse voltage, which had a waveform as shown in FIG. 5 with a voltage exceeding a threshold level voltage $V_{th\ OFF}$ to change the ON state into the OFF state, was applied between the probe electrode 2 and the electrode 102. After that, a bias voltage of 100 mV was applied. It was observed that the ON state returned to the OFF state with a current value of about 1 nA.

After the above tests, while keeping the probe electrode 2 and the recording medium 1 at the distance in the region α of FIG. 3, the xyz fine aligner 5 was driven in the x-direction with the y- and z-axes being fixed. During the scan, a current was monitored. The current was almost constant of about 1 nA. For the next test, the xyz fine aligner 5 was driven only in the x-direction, and the triangular pulse voltage having the waveform of FIG. 4 with the voltage exceeding the threshold level $V_{th\ ON}$ was repeatedly applied at a pitch of 10 nm between the probe electrode 2 and the Au electrode 102. After the writing, the xyz fine aligner was again driven only in the x-direction with a constant bias voltage of 100 mV, and a current flowing between the probe electrode 2 and the Au electrode 102 was measured. The current was observed to change by four digits at a period of 10 nm. This confirmed that the ON state was periodically written in the medium. A ratio of current between the ON state and the OFF state was held constant.

Then the x-directional scan was again conducted over the region where the ON state was periodically written, and the xyz fine aligner 5 was stopped at an arbitrary position of ON state. After the stop, the triangular pulse voltage exceeding the threshold level voltage $V_{th\ OFF}$ with the waveform of FIG. 5 was applied at the position. Repeating the x-directional scan, it was observed that the ON state was erased at the position where the triangular pulse was applied to return to the OFF state of the current of 1 nA. In the same manner as the erasing of arbitrary bit, keeping a voltage exceeding the threshold level $V_{th\ OFF}$ between the probe electrode 2 and the Au electrode 102, a scan was conducted over the recording region. A current measurement after the scan showed that the measured current was almost constant of about 1 nA. This confirmed that all the ON state recorded at the period of 10 nm was erased back into the OFF state.

A next test was a measurement of resolving power with straps of 1 μm written in the above method at various pitches between 1 nm and 1 μm controlling the xyz fine aligner 5. By the measurement of resolving power, it was observed that a pitch over 3 nm assured the same pitch as the written pitch presenting the current change of four digits, but that a pitch below 3 nm gradually decreased the change of current amount.

A second embodiment of the present invention is explained in the following with reference to FIG. 2.

The second embodiment has such an arrangement that a plurality of cantilevers of $SiO_2$ is formed on a Si substrate in length of 100 μm, in width of 20 μm, and in thickness of 1 μm and that a probe electrode is provided at a tip of each cantilever, using the formation methods of cantilever and probe electrode employed in the first embodiment.

Figure 2:
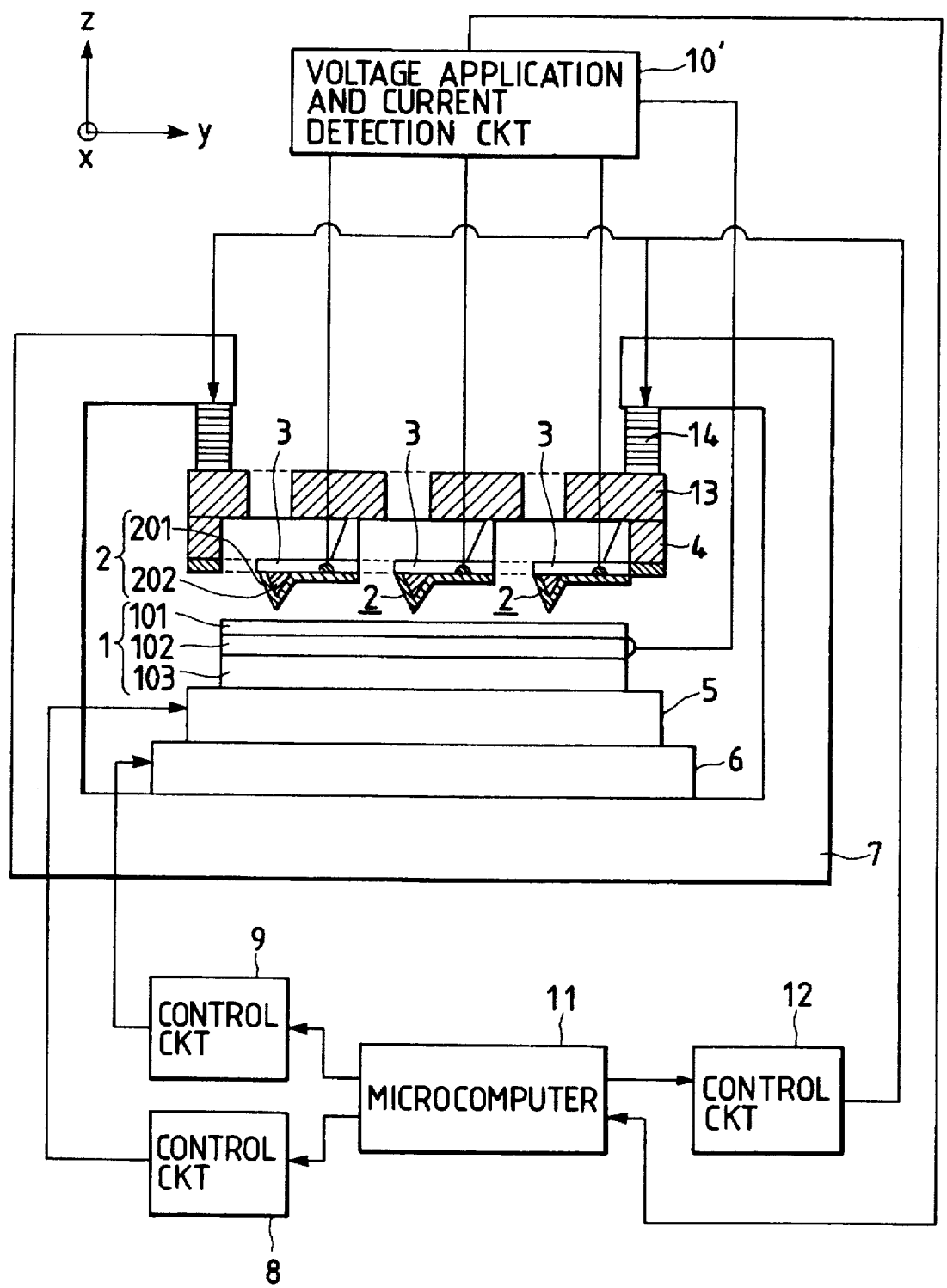
FIG. 2 is a drawing to show a second embodiment of the information recording/reproducing apparatus according to the present invention.

The Si substrate 4 on which the cantilevers are formed is fixed on a support 13 as shown in FIG. 2. The support 13 is attached to a base 7 through at least three piezo-electric devices 14. The piezo-electric devices 14 are individually driven by a piezo-electric device control circuit 12, which is controlled by a microcomputer 11. A voltage application and current detection circuit 10' applies a voltage to the respective probe electrodes 2 and individually detects each current flowing between the respective probe electrodes 2 and a recording medium 1. Other arrangements are same as in the first embodiment.

Fixed on an xyz fine aligner 5 as in the first embodiment is a recording medium 1 having a recording layer 101 of eight layers of SOAZ-LB film formed on an Au electrode 102. Driving an xyz coarse aligner 6 and the xyz fine aligner 5, the probe electrode 2 and the Au electrode 102 are made to approach each other with application of bias voltage of 100 mV between them. Controlling the piezo-electric devices 14, the control circuit 12 adjusts the support 13 such that all the probe electrodes uniformly approach the recording medium 1. The approach of all the probe electrodes is continued up to the state in the region α in FIG. 3. In this state, the xyz fine aligner 5 moves the medium 1 in the x- and y-directions to execute recording, reproducing, and erasing of information with each probe electrode 2 in the same manner as in the first embodiment.

The following tests were conducted with the apparatus of the second embodiment. In the above approach state, the xyz fine aligner was controlled to drive the recording medium in the xy plane, and a current was measured between each probe electrode 2 and the Au electrode 102. The respective probe electrodes 2 presented a current of about 1 nA and had very small fluctuations of current flowing therethrough during the scan. A recording operation is next explained with reference to FIG. 6. While driving the recording medium in the xy plane as above, a writing pulse train as shown in (b) in FIG. 6 based on bit information of (a) in FIG. 6 was produced to apply to the respective probe electrodes. The first bit of the bit information as shown by a-1 in FIG. 6 was set as a bit corresponding to the ON state for any bit information. After the application of the pulse, the recording medium was again driven in the xy plane in the same manner as upon the writing, a current flowing between the respective probe electrodes 2 and the Au electrode 102 was measured with application of bias voltage of 100 mV. The measurement showed a change of current by four digits for each probe electrode. The measured current values were made two-valued to restore a pulse train. The thus-restored pulse train was coincident with the bit information of (a) in FIG. 6, which had originally been applied to the probe electrodes 2.

Figure 6:
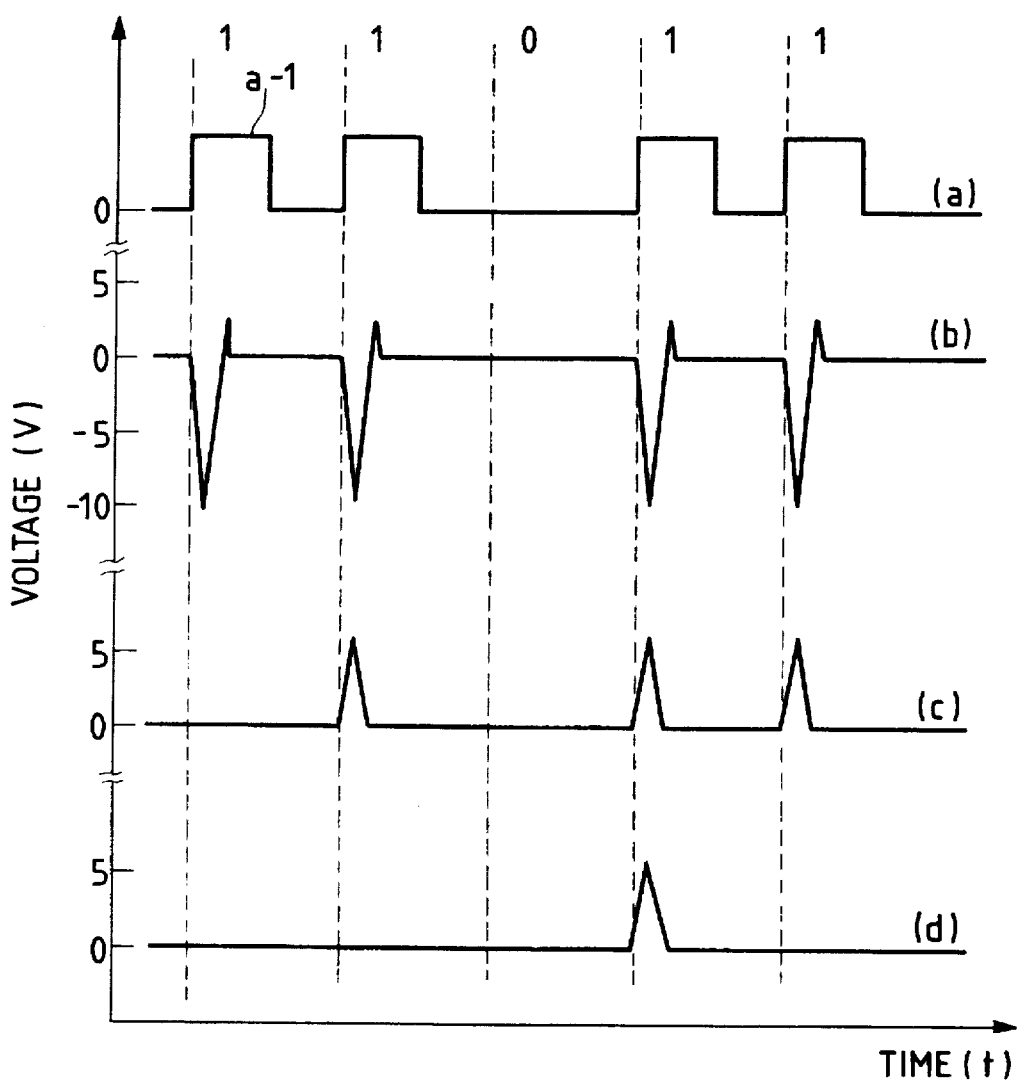
FIG. 6 is a drawing to show bit information, a recording pulse train, and an erasing pulse train given to a probe electrode in tests of recording, reproducing, and erasing with use of a plurality of probe electrodes.

An erasing pulse train as shown in (c) in FIG. 6 was produced based on the respective bit information as written above. It was determined that the first bit for any bit information was kept in the ON state without erasing. The recording medium was driven in the xy plane in the same manner as upon the writing, a current value was measured, and the driving of medium was temporarily stopped at a position where the current value first changed by four digits, which was the first bit. Upon the measurement, the changes of four digits were recognized for all the probe electrodes 2 that were first defined in accordance to the condition of bit information. Then the medium was again driven, and individual erasing pulse trains were applied for the respective probe electrodes 2 corresponding to the before-produced bit information, in synchronism with the driving of the medium. The recording medium 1 was again driven in the xy plane in the same manner as upon the writing to measure a current. All bits except the first bit showed the OFF state or the current value of 1 nA, confirming completion of erasing.

Replacing the erasing pulse used with another erasing pulse train as shown in (d) in FIG. 6, in which an arbitrary bit except the first bit was selected for erasing, the erasing test was conducted in the same manner as above. Only the selected bit was observed to be erased upon erasing.

A third embodiment of the present invention is next explained.

A polyimide monomolecular built-up film is used as a recording layer 101 in the third embodiment. Using a recording layer 102 of polyimide monomolecular built-up film, tests of recording, reproducing, and erasing were conducted in the similar manner as in the first and the second embodiments. The following is a method for forming the polyimide monomolecular built-up film.

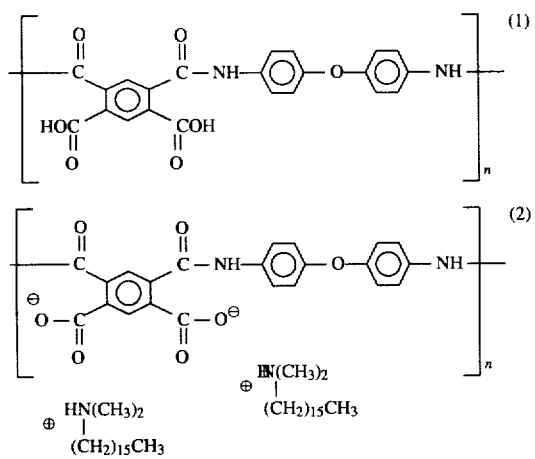

A polyamic acid of molecular weight of about 200,000 as shown in formula (1) was dissolved into an N,N-dimethylacetamide solvent at a molecular reduced density of $1 \times 10^{-3}$M. An N,N-dimethylhexadecylamine was separately adjusted in the same solvent at $1 \times 10^{-3}$M. The polyamic acid-solvent solution was mixed with the separately adjusted N,N-dimethylhexadecylamine-solvent solution at a ratio of 1:2 (V/V), obtaining a polyamic acid hexadecylamine salt solution as shown in formula (2). The mixture was developed on a surface of pure water at a water temperature of 20° C. to form a monomolecular film thereon. After removing the solvent, the surface pressure was increased up to 25 mN/m. Keeping the surface pressure constant, an electrode substrate same as in the first embodiment was quietly dipped into the water at a speed of 5 mm/min as to cross the water surface. Then the substrate was quietly drawn up at 5 mm/min to produce two layers of Y-type monomolecular built-up film. This step was repeated six times to build up twelve layers of monomolecular film. The substrate was then subject to a thermal treatment at 300° C. for ten minutes to imidize the polyamic acid hexadecylamine salt, obtaining a polyimide monomolecular built-up film, as shown in formula (3).

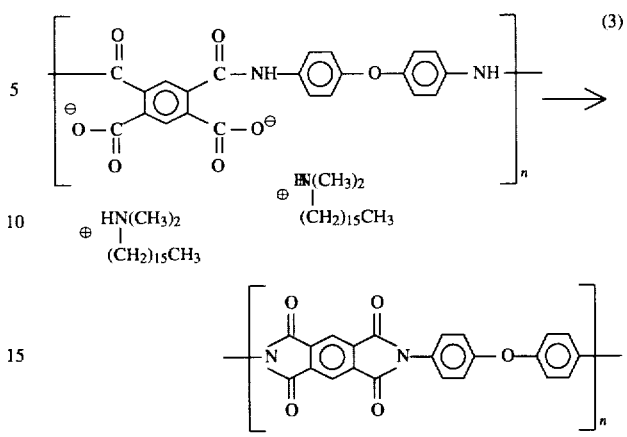

The thus-produced recording medium 1 was also effective to the same recording, reproducing, and erasing as in the first and the second embodiments.

Although the above embodiments employed the LB technique for formation of recording layer 101, the film formation method is not limited to the LB technique, but any film formation method that can form an extremely thin even film may be employed. Specifically, it may be the vacuum deposition method such as the MBE method and the CVD method.

Materials usable for the recording layer 101 include other organic compounds including the π-electron conjugate system, and materials which can change a state of conductivity with application of voltage, for example, inorganic materials such as chalcogen compounds.

Semiconductors may be employed for the electrodes on the recording medium side, integrally including the electrodes and a recording layer.

Further, the present invention is not limited in material of substrate, in form thereof, and in surface structure thereof at all.

Any material which has the conductivity may be applied for the probe electrode in the present invention. A wire may be used also serving as a cantilever, for example, like a platinum wire bent at 90 degrees. Although the above embodiments employ the cantilever beams of $SiO_2$ as the elastic member, the elastic member is not limited to the cantilever beam of $SiO_2$, but may be a bridge beam or both-side-supported beam, a thin film structure, etc. Materials for the elastic member may be leaves of Au, Ni, SUS, BeCu, and so on. In any case, the elastic member must be displaced with a very small force.

The xyz fine aligner is of cylindrical piezo-electric device in the above embodiments, but may be of tripod or of bimorph piezo-electric device.

The apparatuses may be arranged only for recording or only for reproducing information in the above embodiments.

Figure 10:
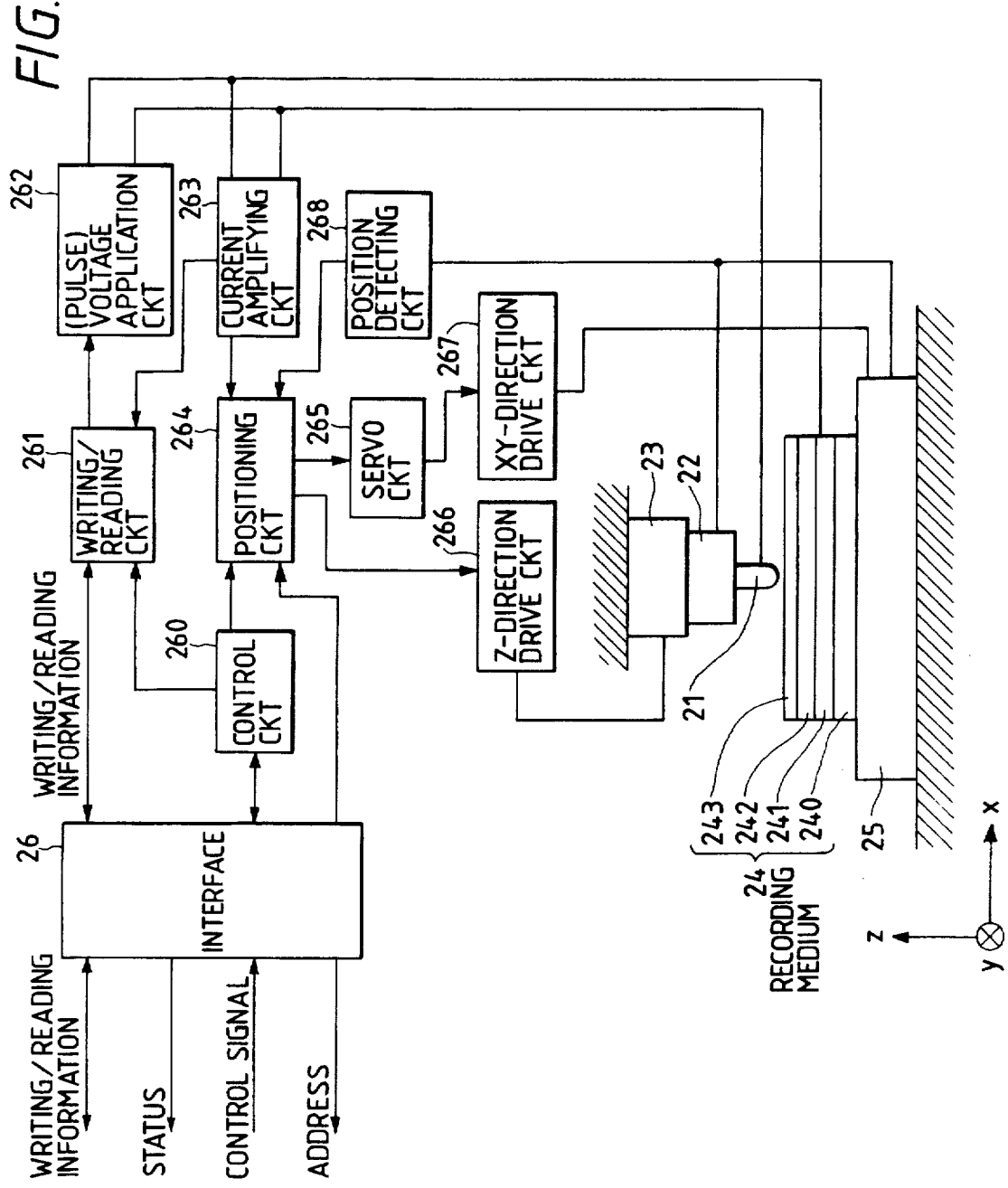
FIG. 10 is a schematic block diagram to show a fourth embodiment of the information recording-reproducing apparatus according to the present invention.

FIG. 10 is a drawing to show a fourth embodiment of the information recording/reproducing apparatus according to the present invention. In FIG. 10, referential numeral 21 denotes a probe electrode made of tungsten in the electrolytic polishing method, 22 an elastic support mechanism for movably supporting the probe electrode 21 in the z-direction while restraining its motion in the x- and the y-directions, and 23 a z-directional coarse aligning mechanism for coarsely moving the probe electrode 21 in the z-direction. Numeral 24 designates a recording medium, which has a surface parallel to the xy plane. Numeral 240 denotes a smooth substrate obtained by cleaving a mica, 241 a foundation electrode obtained by epitaxial growth of Au on the substrate 240, 242 a recording layer composed of eight layers of squarilium-bis-6-octylazulene (SOAZ), which has an electric memory effect and which is built up in the LB technique, and 243 a spacing setting layer of one layer of polyisobutylmethacrylate formed in the LB technique. The recording medium 24 is composed of the substrate 240, the foundation electrode 241, the recording layer 242, and the spacing setting layer 243. Numeral 25 designates an xy-directional scan mechanism for moving the recording medium 24 in the x- and y-directions. Numeral 26 designates an interface for connection to an external apparatus of the information recording/reproducing apparatus. There are signals such as writing/reading information, status signal, control signal of information recording/reproducing apparatus, and address signal exchanged between the interface 26 and the external apparatus. Numeral 260 denotes a control circuit for executing a concentrated control of mutual operations among respective blocks in the information recording/ reproducing apparatus, 261 a writing/reading circuit for writing or reading information or data under a command from the control circuit 260, 262 a voltage application circuit for applying a pulse voltage for writing the data upon recording or for applying a reading voltage upon reproducing the data between the probe electrode 21 and the recording medium 24 under a command signal from the writing/ reading circuit 261, and 263 a current amplifying circuit for amplifying a current flowing between the probe electrode 21 and the recording medium 24. Numeral 268 designates a position detection circuit detecting a contact between the probe electrode 21 and the recording medium 24 through a sensor attached to a later-described elastic support mechanism 23 and for detecting an xy-directional scan position of the probe electrode 21 on the recording medium 24 from a driving state of the xy-directional scan mechanism 25. Numeral 264 is a positioning circuit for positioning the probe electrode 21 and the recording medium 24 based on signals of the current amplifying circuit 263 and the position detection circuit 268 under a command from the control circuit 260, 265 a servo circuit for executing a servo control of positions of the probe electrode 21 and the recording medium 24 based on a servo signal from the positioning circuit 264, 266 a z-directional driving circuit for driving the z-directional coarse aligning mechanism of the probe electrode 21 in accordance to a signal from the positioning circuit 264, and 267 an xy-directional driving circuit for driving the xy-directional scan mechanism 25 to which the recording medium 24 is attached, in accordance to a signal from the servo circuit 265.

Figure 11:
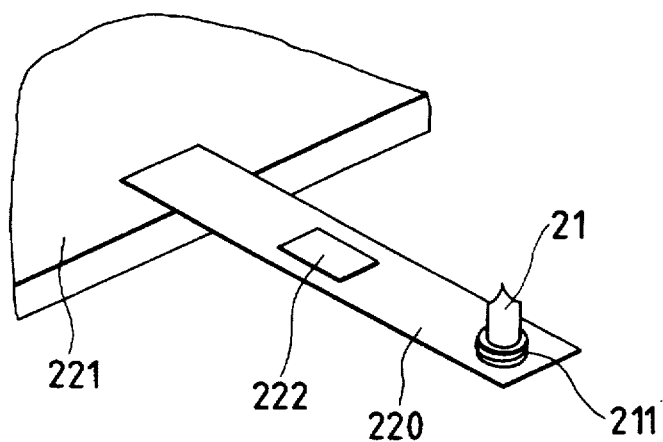
FIG. 11 is a perspective view of a probe electrode and an elastic member in the apparatus as shown in FIG. 10.

Next explained is the elastic support mechanism 22 of the fourth embodiment with reference to FIG. 11. In FIG. 11, referential numeral 21 is a probe electrode which is made of tungsten with a diameter of 25 µm pin-pointed in the electrolytic polishing method, 220 an elastic member made of Au leaf of 1 mm in length, 0.2 mm in width, and 10 µm in thickness, 211 an adhesion portion made of conductive adhesive securing the probe electrode 21 to the elastic member 220, and 221 a base for fixing the other end of the elastic member 220 on the side away from the probe electrode. The base 221 is further adhered to the z-directional coarse aligning mechanism as not shown in FIG. 11. Numeral 222 designates a flexure sensor such as strain sensor for detecting a flexure of the elastic member 222 from a strain of surface.

The following is an explanation of operation of the above apparatus.

Since the probe electrode 21 is set apart from the recording medium 24 upon installation of the recording medium to avoid a collision between them, both are first put closer to each other by the z-directional coarse aligning mechanism 23. The approach procedure is such that the z-directional coarse aligning mechanism 23 is first driven to force the probe electrode 21 to approach the recording medium 24 before a contact between the probe electrode 21 and recording medium 24 is detected by the flexure sensor 222 attached to the elastic support mechanism 22. The contact is judged as present with flexure of the elastic member 220. During the contact, the probe electrode 21 is urged against the recording medium 24 with an elastic force due to the flexure of the elastic member 220. The spacing setting layer 243 sets a spacing between a tip of the probe electrode 21 and the recording layer 242 of recording medium. The spacing is about 1 nm in thickness of one layer of polyisobutylmethacrylate. The z-directional coarse aligning mechanism 23 is held in this state. A bias voltage of 0.1 V is applied by the voltage application circuit 262 between the probe electrode 21 and the foundation electrode 241 of the recording medium. With the application of bias voltage, the recording medium 24 is scanned by the xy-directional scan mechanism 25 with respect to the probe electrode 21, so that the recording/reproducing may be conducted while keeping the spacing between the probe electrode 21 and the foundation electrode 241 of the recording medium. A test was conducted in this state to check read information, but there was no information written. In more detail, an output value of the current amplifying circuit 63 obtained with scanning of the recording medium 24 was almost constant below 1 pA after converted into a current flowing between the probe electrode 21 and the foundation electrode 241 of the recording medium 24.

Figure 12:
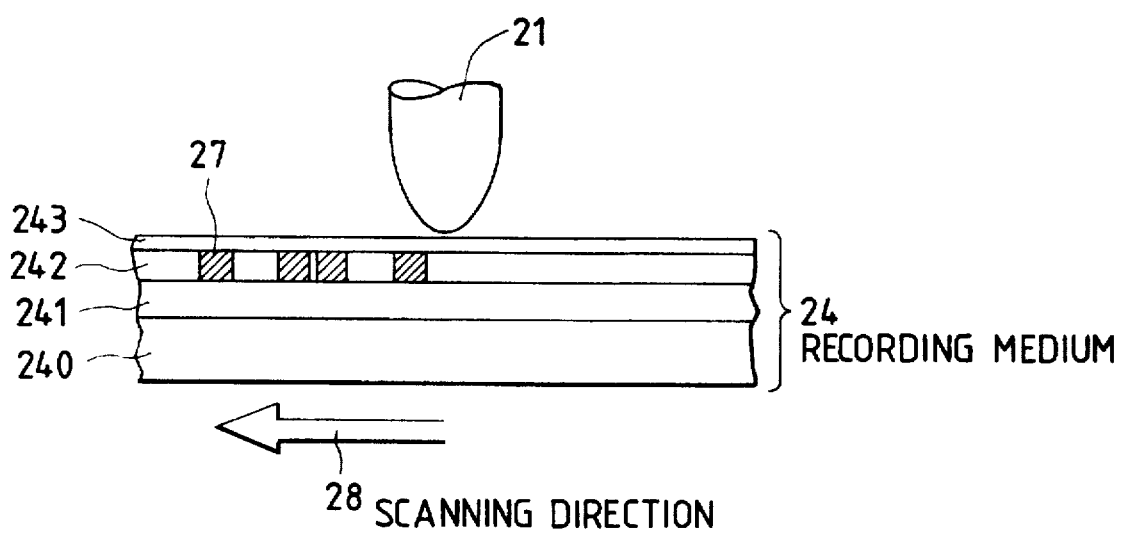
FIG. 12 is a sectional view to illustrate a positional relation between a probe electrode and a recording medium upon recording.

A recording is effected by applying a writing voltage to the probe electrode 21 at a writing position in the recording region by the voltage application circuit 262 during the scan of the recording medium 24. The writing voltage is a voltage enough to change the recording layer 242 having the electric memory effect into the ON state of low resistance. FIG. 12 shows an xz section to illustrate a relation between the probe electrode 21 and the recording medium 24 upon the recording. In FIG. 12, referential numeral 27 is a recording bit, which is an ON portion in the recording layer, and 28 an arrow representing the scanning direction of the recording medium 24. The scanning direction is the x-direction in FIG. 12. Timings of writing are based on control signals from the control circuit 260. The x-directional recording is carried out while scanning the recording medium 24. After completion of one series of x-directional recording, the recording medium 24 is shifted by one row in the y-direction to continue another series of x-directional recording similarly. A writing voltage is applied at each voltage application position on the recording medium 24 during the scanning of the recording medium 24, thereby forming a recording bit 27.

The reproduction of the recorded information is effected as follows. A reading voltage for example of 0.1 V is applied between the probe electrode 21 and the foundation electrode 241 of the recording medium. The recording medium 24 is scanned by the xy-directional scan mechanism 25 with the application of the reading voltage in the same path as upon the recording to observe a current change with the current amplifying circuit 263. The applied voltage is set to a value small enough not to cause a change of the recording layer 242 in resistivity. An actual output value of the current amplifying circuit 263 obtained while scanning the recording medium 24 was 0.1 nA at a position of recording bit 27 and below 1 pA at other positions after conversion into a current flowing between the probe electrode 21 and the foundation electrode 241 of the recording medium 24. The current change is turned into read information by the writing/reading circuit 261 to be transmitted through the interface 26 to a host apparatus. A timing of reading depends upon a control signal from the control circuit 260.

Upon either recording or reproducing, the distance between the probe electrode tip and the recording layer was precisely set by the spacing setting layer, resulting in stable information recording and reproducing. The recording bits had a diameter of 90 nm.

The probe electrode is of tungsten rod polished in the electrolytic polishing method in the present embodiment, but may be replaced with a rod of platinum-rhodium or of platinum-iridium pollshed in the electrolytic polish or in the mechanical polish.

Figure 13:
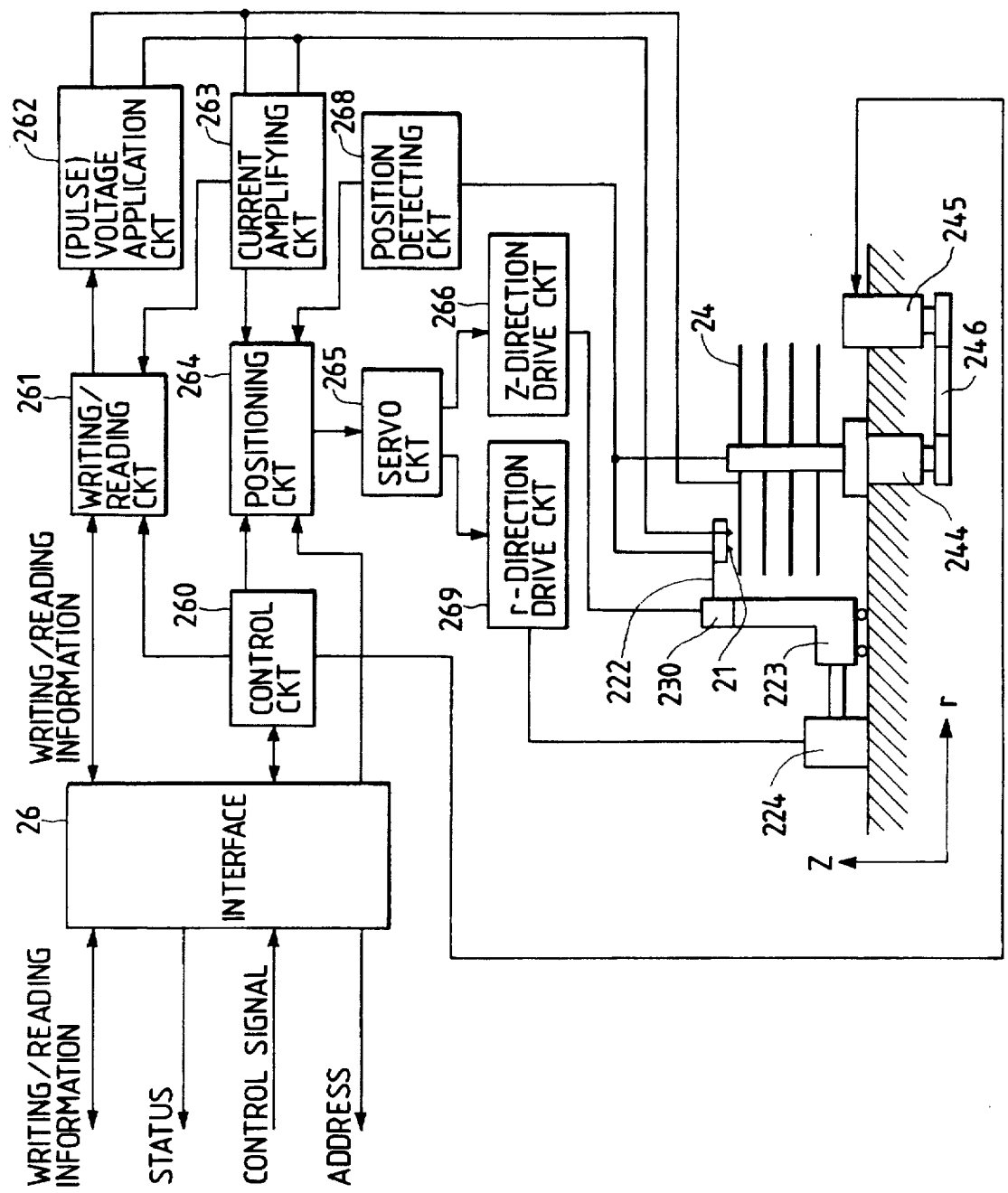
FIG. 13 is a schematic block diagram to show a fifth embodiment of the information recording/reproducing apparatus according to the present invention.
Figure 15:
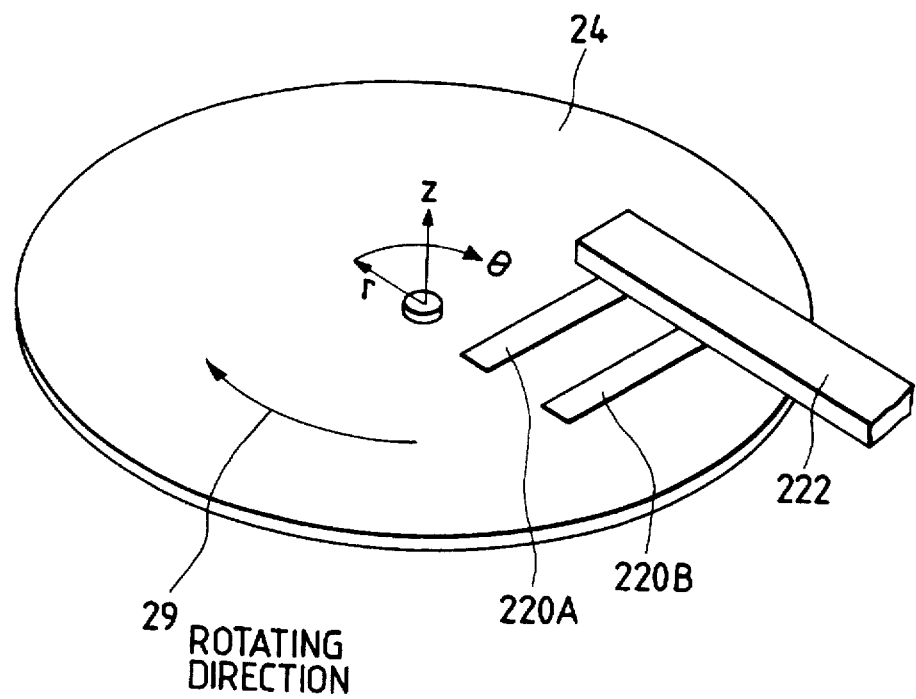
FIG. 15 is a perspective view to show a positional relation between a disk recording medium and two elastic members.

FIG. 13 is a drawing to show a fifth embodiment of the present invention. In FIG. 13, referential numeral 21 denotes a probe electrode, 222 a support on which a unit of two probe electrodes are provided, 230 a z-directional coarse aligning mechanism including a tilt mechanism for moving the probe electrodes 21 through the support 222 in the z-direction, 223 a carriage for moving the probe electrode 21 in the r-direction or in the radial direction of the recording medium, and 224 an r-directional driving mechanism for driving the carriage 223. Numeral 24 is a recording medium, which is obtained by depositing a foundation electrode of Au on a polished glass disk by the sputtering method, by building up a recording layer of eight layers of SOAZ having the electric memory effect in the LB technique, and further by building up a spacing setting layer of one layer of polyisobutylmethacrylate in the LB technique. Numeral 244 denotes a spindle for holding to rotate the recording medium 24, 245 a motor for rotating the spindle 244, and 246 a belt for transmitting the rotation of the motor 245 to the spindle 244. Information recording and reproducing is conducted in a circumferential direction of rotation in this embodiment while rotating the recording medium. Most of blocks in circuit are common to those in the previous embodiment except that the control circuit 260 executes rotation start/stop control of the motor 245, that a switching device not shown is provided for switching to apply a recording voltage from the circuit 262 to the two probe electrodes and for switching the current amplifying circuit 263 to amplify signals from the two probe electrodes and then transmit the amplified signals to the circuit 261, that a coordinate system employed is employed of r, θ, and z with reference to a rotation center of the spindle 244 as shown in FIG. 15, and that an r-directional driving circuit is provided for generating a drive signal for the r-directional driving mechanism which drives the carriage 223 with the probe electrode 21 attached thereto in the r-direction or in the radial direction of rotation in accordance to the signal from the servo circuit 265.

Figure 14:
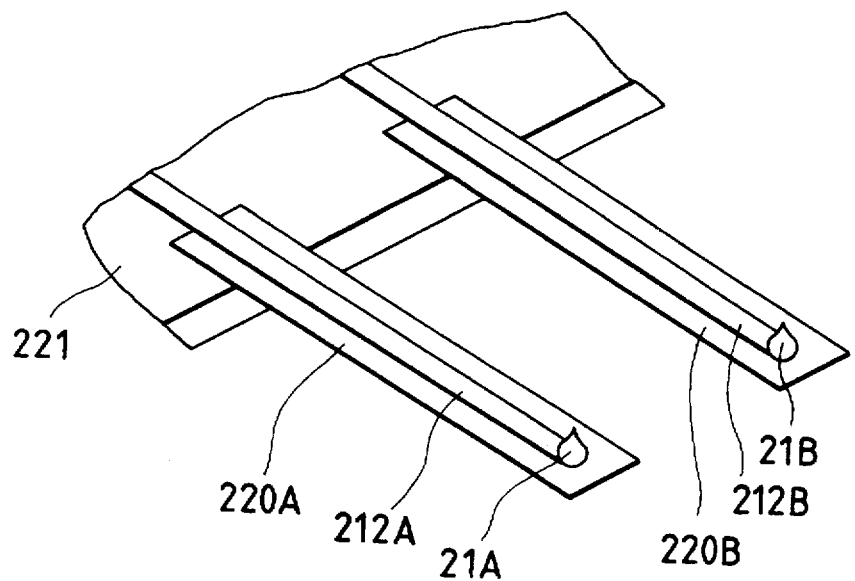
FIG. 14 is a perspective view of two probe electrodes and elastic members.

FIG. 14 is a perspective view of an area around the two probe electrodes used in the recording/reproducing apparatus of the fifth embodiment. In FIG. 14, numerals 21A and 21B represent probe electrodes, 212A and 212B drawing electrodes made of Au for drawing signals of the probe electrodes, 220A and 220B elastic members of Si of 0.8 mm in length, 0.1 mm in width, and 5 μm in thickness, and 221 a base which is to be secured to the support 222. Although not shown in FIG. 14, there are sensors formed on the elastic members 220A and 220B for detecting flexures thereof similarly as in the fourth embodiment. The probe electrodes 212A, 212B and the elastic members 220A, 220B are produced in the so-called micromechanics technique (K. E. Petersen, Proc. IEEE 70, 420 (1982)), which allows precise production of identical shape.

An operation of the apparatus of this embodiment is next explained with reference to FIGS. 13 and 15. The probe electrodes 21 are initially set apart from the recording medium 24 to avoid a collision therewith. The motor 254 is first driven to rotate the spindle 244 to in turn rotate the recording medium 24. A rotational direction 29 is so determined that the fixing portions of the elastic members are located on the upstream side of rotation as shown in FIG. 15. After the rotation of the recording medium is stabilized, the z-directional coarse aligning mechanism (tilt mechanism) 230 is driven to bring the probe electrodes closer to the recording medium before the sensors attached to the elastic members 220A and 220B detect both contacts of the probe electrodes 21A and 21B with the recording medium, that is, until the two flexure detecting sensors detect the both flexures. Upon the contact, the probe electrodes 21A, 21B are urged against the recording medium 24 by the elastic force due to the flexures of the respective elastic members 220A, 220B. A spacing is of about 1 nm in thickness of one layer of polyisobutylmethacrylate between the respective tips of the probe electrodes 21A, 21B and the recording layer of the recording medium. The z-directional coarse aligning mechanism 23 is held in this state, and the probe electrodes are moved on the recording medium by the r-directional driving mechanism, to carry out the recording and reproducing.

Figure 16:
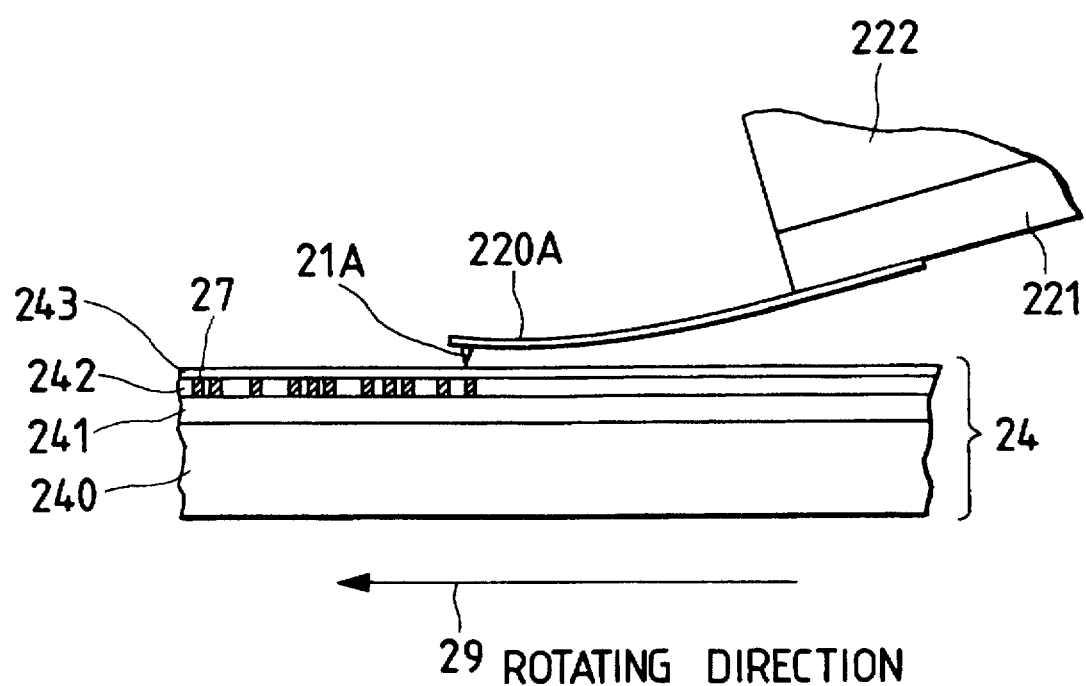
FIG. 16 is a sectional view to show a positional relation between a probe electrode and a recording medium upon recording/reproducing.

The same recording/reproducing method as in the preceding embodiments may be employed in the present embodiment. FIG. 16 is a θz section to show a relation between the probe electrodes 21A and the recording medium 24 during the recording and reproducing. In FIG. 16, numeral 27 represents a recording bit, which is an ON portion in the recording layer, and 29 an arrow showing a rotational direction of the recording medium 24.

As described above, the spacing setting layer is composed of one layer of LB film, so that the spacing setting layer may be adhered onto the recording medium with a strong force in an even thickness. Therefore, the stable distance may be set and maintained between the probe electrode tips and the recording layer over the recording region. Further, the spacing setting layer has a sufficient strength to stand the contact with the probes.

The material of the spacing setting layer is the polyisobutylmethacrylate in the above embodiment, but may be replaced for example with polymethylmethacrylate, polyethylene, polyvinylchloride, or polyisobutylene. Further, any material which can form an even film of thickness of about 1 nm and which has no electric memory effect may be employed for the spacing setting layer of the present invention.

Figure 17:
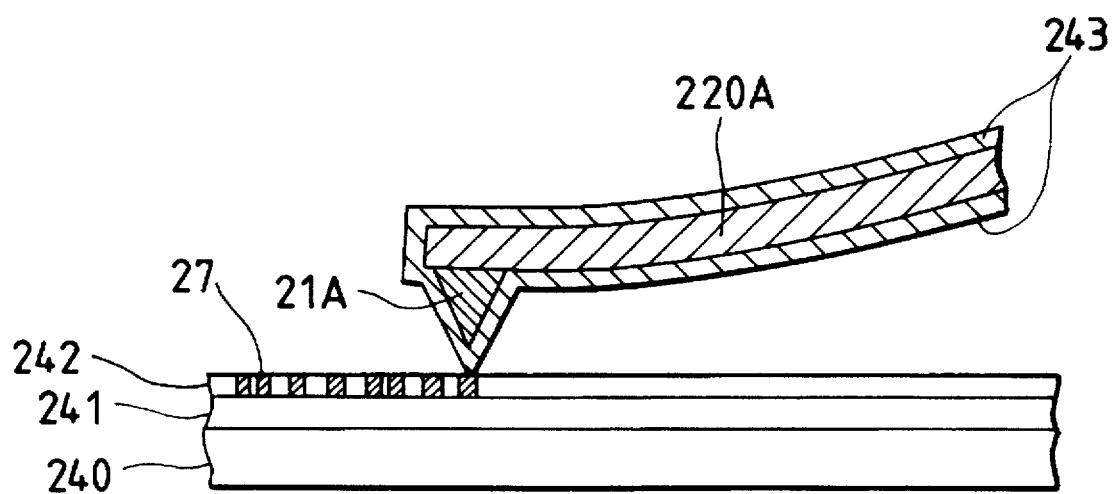
FIG. 17 is a drawing to show a modification of the fourth and the fifth embodiments.

In the fourth and the fifth embodiments, the spacing setting layer is set on the recording medium side, but may be set on the probe electrode side as shown in FIG. 17. Further, the SOAZ is exemplified to form the recording layer, but any other materials having the electric memory effect may be employed therefor. The apparatus is explained to execute both the recording and the reproducing in the above embodiments, but may be arranged to have only one function either of recording or of reproducing.

A sixth embodiment of the present invention is next explained.

Figure 18:
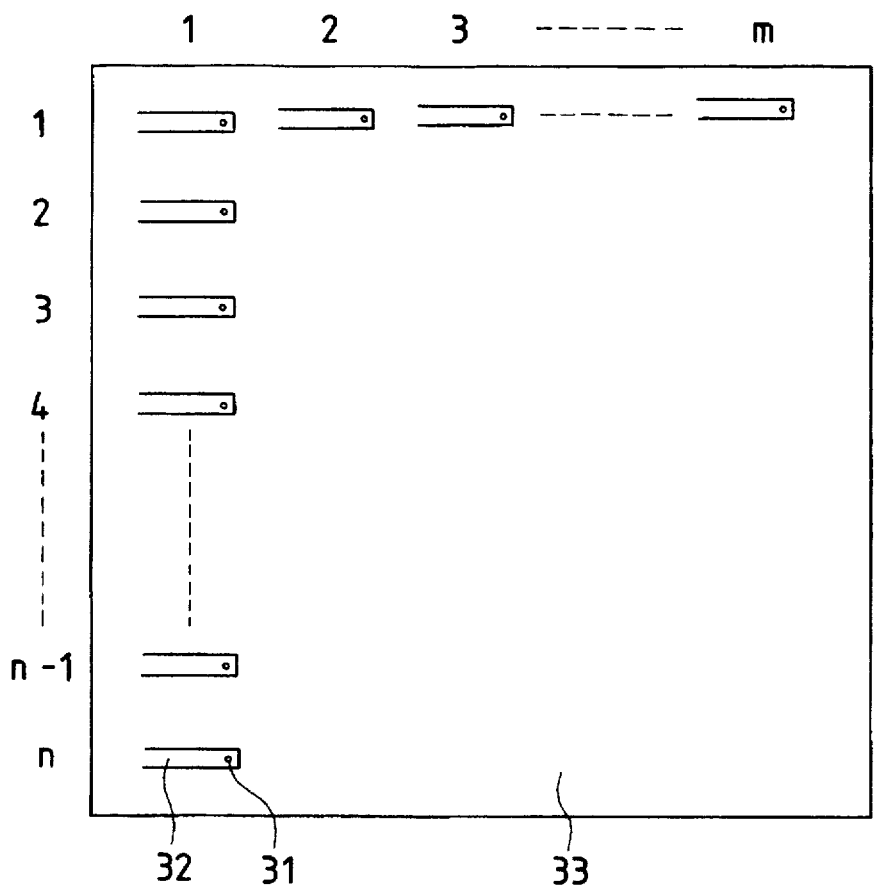
FIG. 18 is a detailed drawing of a recording head in a sixth embodiment of the information recording/reproducing apparatus according to the present invention.

FIG. 18 is a structural drawing of a recording head portion mainly of probe electrodes in the sixth embodiment of the present invention. In FIG. 18, referential numeral 31 denotes a probe electrode, and 32 a probe moving mechanism for adjusting a spacing between a tip of each probe electrode and a surface of medium by moving the each tip of probe electrodes in the vertical direction to the medium surface, which is paired with the corresponding probe electrode 31. Numeral 33 denotes a support for unitedly supporting the plural probe moving mechanisms 32, incorporating m×n sets of probe moving mechanisms 32 and probe electrodes 31 into a recording head unit. The respective probe moving mechanisms 32 are supported on the support 33 at respective left ends thereof in FIG. 18. The probe moving mechanisms 32 may displace in a direction vertical to the face of the figure, pivoting on the supported ends. Numbers on the left side of FIG. 18 are row numbers of the respective probes 31 or the probe moving mechanisms 32, and those on the upper side of the support 33 are column numbers thereof.

Figure 19:
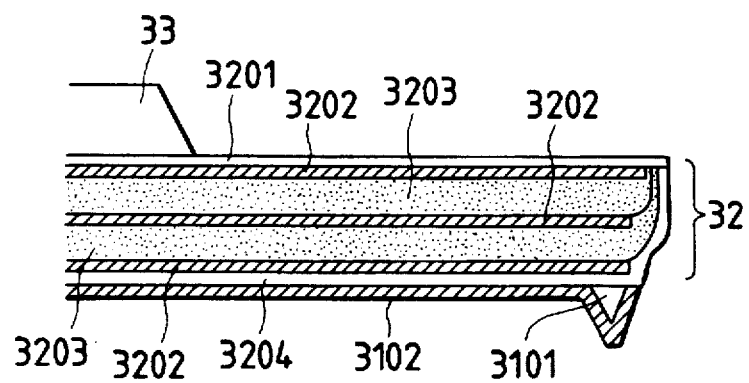
FIG. 19 is a detailed drawing of a probe electrode as shown in FIG. 18.

FIG. 19 shows a detailed structure of each of the probe electrodes 31 and the probe moving mechanisms 32 as shown in FIG. 18. In FIG. 19, a bimorph piezo-electric actuator is formed of elastic members 3201 of cantilever beam structure of $SiO_2$, metal electrodes 3202 on the cantilever beam, and piezo-electric thin films 3203 of AlN, alternately laminated. By applying a voltage between the metal electrodes 3202, the actuator may be driven to bend in an outward direction of the plane of the piezo-electric thin film. A tip 3101 of each probe electrode is produced by implanting Si onto $SiO_2$ in the focussed ion beam, and further by depositing Au thereon as a conductive coat 3102 in the present embodiment. These may be integrally formed on a silicon wafer in the micromechanics technique. The probe electrode in FIG. 19 is emphasized larger than the actual size for easy recognition. The structure of the elastic member as the probe moving mechanism 32 is not limited to such a cantilever beam. Also the actuator is not limited to the bimorph structure, but may be any structure enabling to move the probe electrode tip towards the recording medium surface. The materials for them are not limited to the above-described materials, either. Further, the shape of the probe electrodes 31, and, the formation method and the treatment thereof are not limited to those in the above embodiment.

Figure 20:
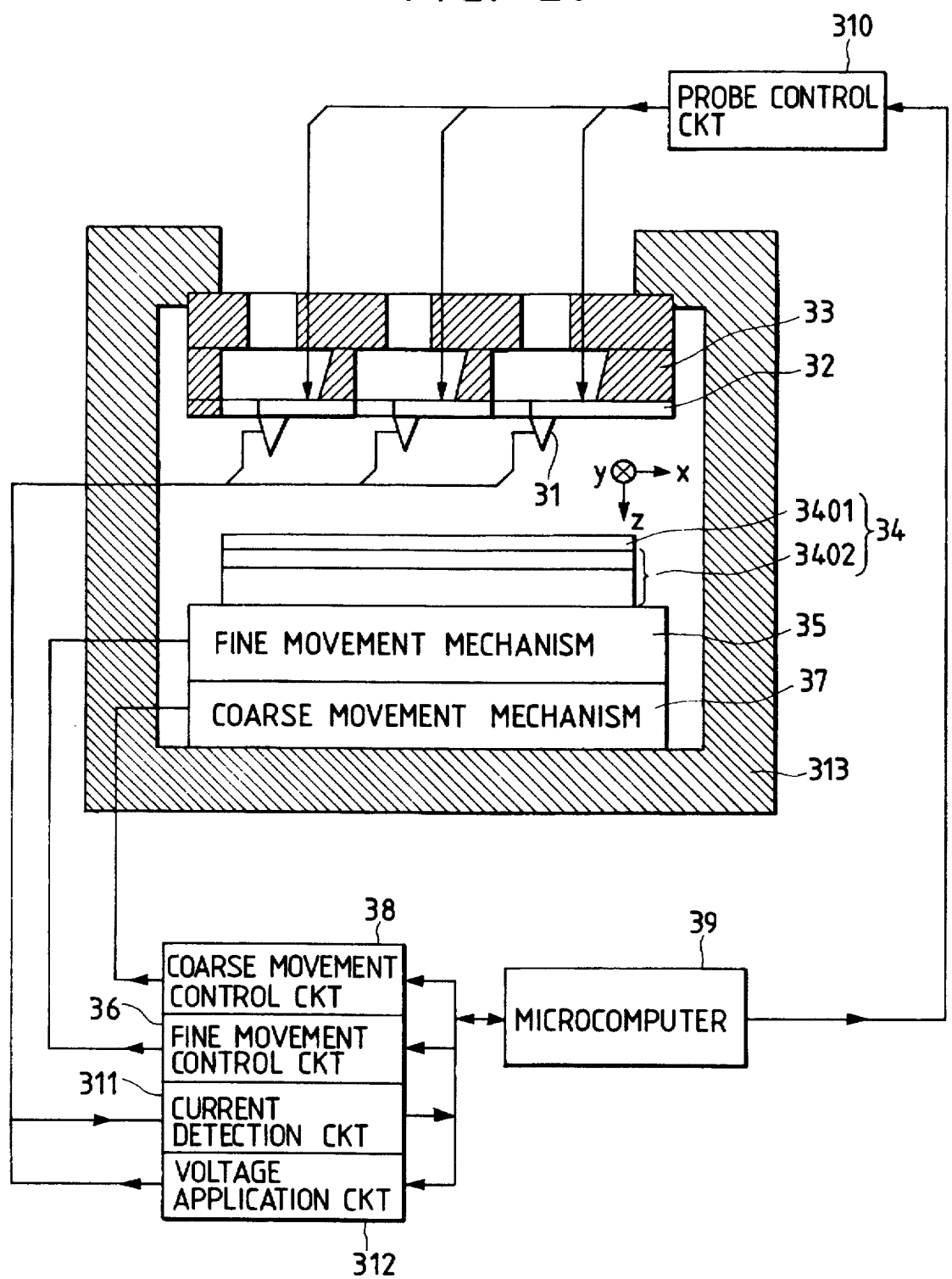
FIG. 20 is a drawing of entire structure to show the sixth embodiment of the information recording/reproducing apparatus according to the present invention.

FIG. 20 is a drawing of an entire structure of an information recording/reproducing apparatus having the above mechanism. FIG. 20 shows an example in which the column number m of probe moving mechanisms 33 supported by the support 33 is equal to 3. Numeral 34 designates a recording medium, in which a recording layer 3401 is formed on a conductive substrate 3402. The recording layer 3401 is for example of eight layers of SOAZ (squarilium-bis-6-octylazulene) built-up film formed in the LB technique. Numerals 35 and 37 designate a medium fine movement mechanism and a medium coarse movement mechanism, respectively, which perform three-dimensional fine movement and coarse movement of the recording medium 34 with respect to the support 33 and which change an inclination between facing surfaces of the recording medium 34 and of the support 33. A fine movement control circuit 36 and a coarse movement control circuit 38 carry out drive controls of the medium fine movement mechanism 35 and the medium coarse movement mechanism 37, respectively. A probe control circuit 310 conducts independent drive controls of the respective probe moving mechanisms 32 of the plural probe electrodes. A current detection circuit 311 independently detects a current flowing between the respective probe electrodes 31 and the recording medium 34. A voltage application circuit 312 independently applies a voltage for recording, reproducing, and erasing between the respective probe electrodes 31 and the recording medium. A microcomputer 39 executes a central control of the entire apparatus. A housing 313 encloses all the above mechanisms excluding the control circuit, incorporating them into a unit. Any mechanism may be employed if It can change the relation of relative position between the support 33 and the recording medium 34, and the inclination between the facing surfaces of the support 33 and of the recording medium 34, without limiting to the above arrangement. For example, the coarse movement mechanism and the fine movement mechanism may be disposed on the side of the support 33, or the moving mechanisms may be split on the support side and on the recording medium side.

Next explained is a detailed operation of the apparatus thus arranged. In FIG. 20, the x-axis and the y-axis are perpendicular to each other on the support 33, the z-axis is perpendicular to the x- and y-axes, a direction is positive towards the recording medium. A z coordinate of a tip position of each probe electrode is defined as a deviation in a non-driven state of corresponding probe driving mechanism. Since a probe electrode is integrally formed on the support, x and y coordinates of the probe electrode tip would be known as preliminary design values or may be measured upon formation. Since a deviation amount of each probe moving mechanism is controlled by a control voltage, the deviation amount may be represented by a function of the control voltage. Therefore, if deviation-voltage characteristics are preliminarily known as design values or as measured values and stored in the microcomputer, a deviation amount could be known by monitoring the control voltage.

Figure 21B:
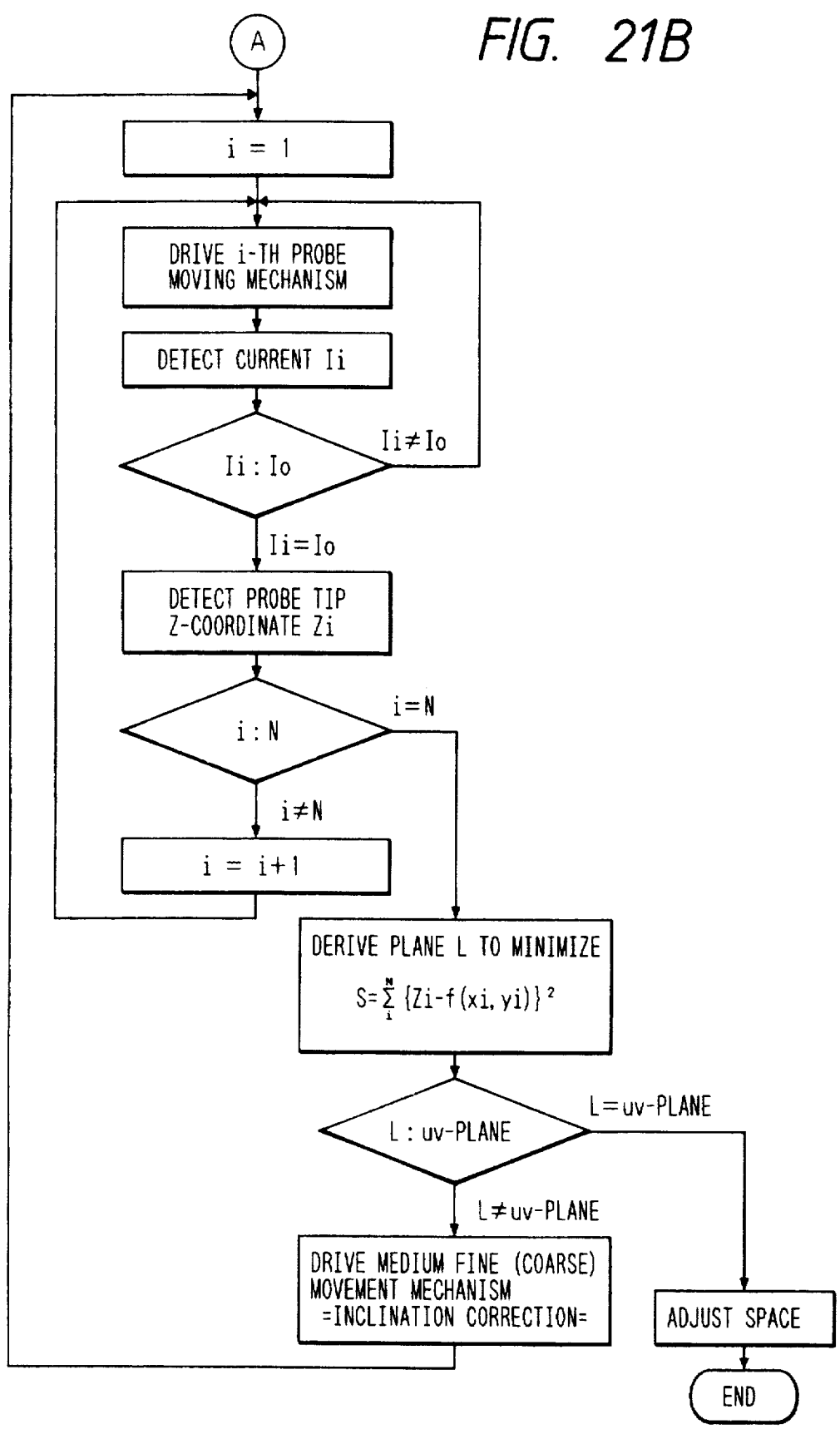
FIG. 21, which is comprised of FIGS. 21A and 21B, is a flowchart to show an operation of the apparatus of the sixth embodiment.

An approach procedure of the probe electrodes is as follows. FIG. 21 is a flowchart to show the approach procedure. Operational steps as shown are conducted based on a command from the microcomputer 39. A predetermined bias voltage is first applied by the voltage application circuit 312 identically to all the probe electrodes. Monitoring currents flowing through the respective probe electrodes, the medium coarse movement mechanism 37 makes the recording medium coarsely approach the support to a certain extent within a distance at which no current flows through the probe electrode, and then the medium fine movement mechanism 35 finely decreases a spacing between the recording medium and the support of the probe electrode group. During the approach, the current detection circuit 311 individually detects currents flowing through the respective m×n(=N) of probe electrodes. A value of current flowing through each probe electrode gradually increases as it approaches the recording medium. Once either one of the probe electrodes 31 first has a current exceeding a preset threshold level, the approach of the recording medium by the medium fine movement mechanism 35 is temporarily stopped. Then a control voltage for the probe moving mechanism corresponding to the probe electrode with a current exceeding the threshold level is controlled to make only the probe electrode retreat by a predetermined distance, that is, to move the same in a direction to leave the recording medium surface. After that, the approach of the recording medium is again started towards the probe electrode group. Out of the rest of the probe electrodes excluding the retreated probe electrode, another probe electrode which next first exceeds the threshold level is made to retreat likewise. The recording medium then again starts approaching the probe electrodes. Repeating this step, the recording medium is stopped approaching when all the m×n of probe electrodes have respective currents exceeding the threshold level.

After the stop of approach, the control voltages for the respective probe moving mechanisms are so adjusted as to equalize the currents flowing through the respective probe electrodes to the threshold level. The respective states are maintained thereafter. By this adjustment, all distances between the probe electrode tips and the recording medium are kept equal.

Although a surface of medium is usually a curved surface, the thus-achieved state is equivalent to such a state that a medium surface is planer and all probe tips align on an identical plane while the both planes face in parallel with each other. Therefore, considering a new coordinate system (u, v, w) in which w coordinate is defined as a position of the z-directional deviation from each of the thus-achieved states of the respective probe electrodes, that is, from w=0 at a position of probe electrode tip in the above state, and in which u and v coordinates are similarly defined corresponding to x, y coordinates of the respective probe electrodes, the spacing adjustment reaches a problem to let two planes opposing in parallel even for a general medium surface. In other words, the medium surface may be assumed as a plane in the (u, v, w) coordinate system.

From the control voltages applied to the respective probe moving mechanisms 32 and held, deviation amounts of the respective probe electrodes are obtained with respect to positions in the non-driven states of the probe moving mechanisms. After multiplying the obtained deviation amounts by −1, all values are stored as w coordinates upon no driving of the probe electrode tips.

A virtual plane may in general be represented by the following equation in the (u, v, w) coordinate system.

$$w = f(u, v) = au + bv + c \quad (1)$$

Using the w coordinates of the respective probe electrodes as obtained above, the following summation is sought.

$$S = \sum_{i}^{N} \{w_i - f(u_i, v_i)\}^2 \quad (\text{Eq. 2})$$

The summation is taken over the m×n(=N) of probe electrodes. Values a, b, c are next obtained to make S minimum. Such values may be obtained by solving the following simultaneous equations.

$$\partial S/\partial a = 0 \quad (3)$$

$$\partial S/\partial b = 0 \quad (4)$$

$$\partial S/\partial c = 0 \quad (5)$$

A virtual plane (L) represented by equation (Eq.1) is determined with the thus-obtained values a, b, e. The determined plane is a plane which minimizes a sum of squares of w-directional deviation amounts of the respective probe electrode tips from the virtual plane, taken over all the probes. If both a and b are zero, it can be assumed that the medium surface, which is expressed as uv plane in FIG. 21, is located at a position to minimize the sum of squares of the deviation amounts of the respective probe electrodes with respect to the support of the probe electrodes. However, if either one of a and b is not zero, the medium surface is assumed to be inclined with respect to the support of the probe electrodes.

When the medium surface is assumed to be inclined with respect to the support of the probe electrodes, the inclination is compensated for by driving either the medium fine movement mechanism 35 or the medium coarse movement mechanism 37. The following is a specific example of the inclination compensation. In case that a means for changing the inclination is three piezo-electric devices independently displaced, using the above equation (Eq.1) with u and v coordinates equivalent to x and y coordinates and preliminarily obtained for the three devices, w coordinates are taken at the respective u, v coordinates to make the medium surface in parallel with the above plane. The microcomputer 39 calculates w-directional movement amounts necessary for making them identical, for the respective piezo-electric devices. The microcomputer 39 sends a command signal in accordance with the moving amounts to the coarse movement control circuit 38 or to the fine movement control circuit 36 to displace the respective piezo-electric devices.

The above step is repeated if necessary, whereby adjusting the inclination between the facing planes of the recording medium and the probe electrode support so as to minimize the sum of squares of probe deviation amounts and so as to locate the virtual plane L and the medium surface in parallel with each other in the (u, v, w) coordinate system after spacing adjustment as below described.

The spacing adjustment is effected as follows. First obtained is an average $w_0$ of all w coordinates of the probe electrode tips which have been stored in the microcomputer 39. While a spacing between each probe electrode tip and the recording medium is adjusted to a value corresponding to the above-mentioned threshold level with a command signal from the microcomputer, the recording medium is moved by $-w_0$ either by the medium fine movement mechanism 35 or by the medium coarse movement mechanism 37 in the w-direction without changing the inclination. While again monitoring currents flowing the respective probe electrodes in that state, control voltages for the respective probe moving mechanisms are varied. Once the currents flowing through the respective probe electrodes become equivalent to the threshold level, respective control voltages in that moment are held. By this, the control voltages for the respective probe moving mechanisms may be distributed around zero, which is in a non-driven state of the probe moving mechanisms, and the sum of squares of deviation amounts over all probe moving mechanisms may be minimized.

The following modification may be employed instead of the above probe approaching method in the sixth embodiment. Without using the fine movement mechanism 35 and the coarse movement mechanism 37, an identical drive voltage is applied to all the probe moving mechanisms within such a range that a current does not exceed the threshold level between each of the probe electrodes and the medium surface, to put the respective probe electrode tips uniformly closer to the recording medium surface. After that, the same procedure as in the sixth embodiment is taken.

After completion of the adjustment following the above procedure, if a distance between a probe electrode and the medium is fluctuated, a current flowing between them will change with the fluctuation. The microcomputer 39 executes a feedback control of the probe moving mechanism based on the deviation of current from the preset threshold level, maintaining the distance between them constant.

An operation of recording (erasing) or reproducing is carried out after position alignment while keeping the recording medium and the probe electrode tips in the approached state with each other in the above procedure. The following explanation refers to a signal diagram of FIG. 22. A bias voltage of 0.5 V was applied to all the probe electrodes, and the preset threshold level of current was $3 \times 10^{-10}$ A. Driving the recording medium in a plane parallel to the x-axis and to the y-axis as will be referred to as xy plane, a writing pulse train, for example of (b) in FIG. 22 which was produced based on individual bit information for example of (a) in FIG. 22 as information for one probe electrode, was applied to each of the probe electrodes. The first bit of the bit information is always a bit corresponding to the ON state for all bit information.

After the application of pulses, the recording medium was again driven in the xy plane in the same manner as upon the writing, a current flowing between each of the probe electrodes and the medium was measured under the condition of application of bias voltage of 0.5 V. A change in current of four digits was observed at each position of pulse applied in each probe electrode. The obtained current measurement values were made two-valued with a proper threshold level to restore a pulse train for each probe electrode, which was coincident with the individual bit information of (a) in FIG. 22 which had originally been applied to the each probe electrode.

Figure 22:
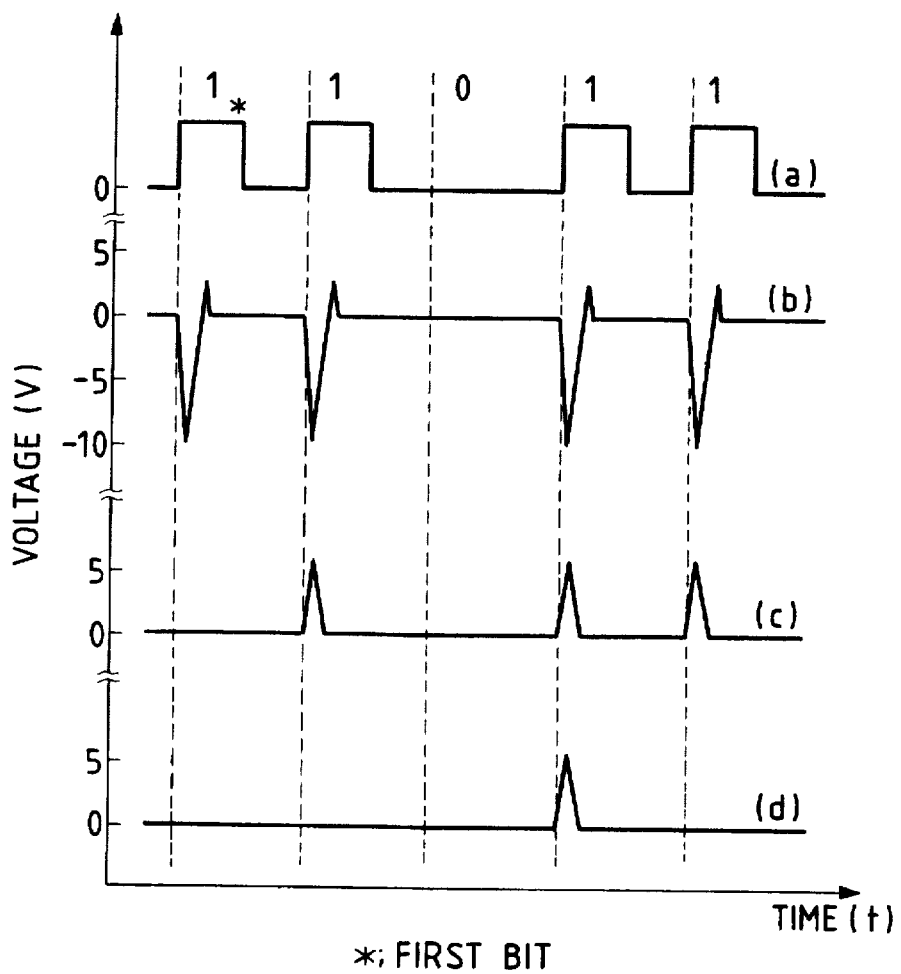
FIG. 22 is a drawing of signals of pulse trains given to a probe electrode upon recording (erasing) and reproducing in the sixth embodiment.

An erasing pulse train for example of (c) in FIG. 22 was produced based on each of the individual bit information written in the above step. The first bit was set to keep in the ON state without erasing for all bit information. Driving the recording medium in the xy plane in the same manner as upon writing, a current was measured, and the drive of medium was temporarily stopped at a position of first bit, i.e., at a position at which the current value first changed by four digits. All the probe electrodes showed the change of four digits as first defined as bit information. Then the medium was again driven, and corresponding individual erasing pulse trains were applied for the individual probe electrodes in synchronism with the drive of medium. The recording medium was again driven in the xy plane in the same manner as upon the writing to measure currents. All the bits except the first bit were in the OFF state, that is, showed current values of about $3 \times 10^{-10}$A, confirming completion of erasing.

Instead of the erasing pulse as used, another erasing pulse train, for example of (d) in FIG. 22 in which an arbitrary bit excluding the first bit out of the written bit information was selected to be in the ON state, was produced for another erasing test similarly as in the above-described procedure. It was observed in this erasing test that only the selected bit was erased.

Figure 23:
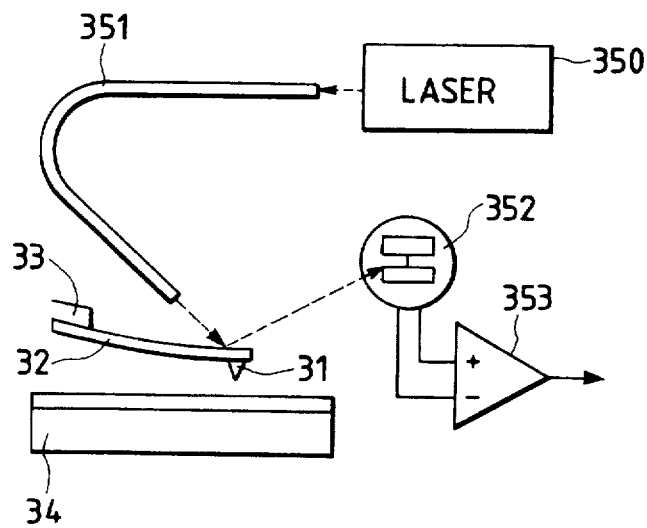
FIG. 23 is a drawing to show a part of a seventh embodiment of the information recording/reproducing apparatus according to the present invention.

Next explained is a seventh embodiment of the present invention. The seventh embodiment is different from the sixth embodiment as above described in that a distance between a probe tip and a recording medium is obtained by detecting a flexure of cantilever beam moving a probe electrode with use of optical means. FIG. 23 is a scheme to illustrate a major part of the seventh embodiment. In the seventh embodiment, m×n of such optical detection means are arranged on a support 33 as shown in FIG. 18.

Each of cantilevers is provided with a probe moving means as shown in FIG. 19 similarly as in the sixth embodiment. Other arrangements are essentially the same as those in FIG. 20 except that a microcomputer 39 also receives an output from a comparator 353 as well as that from a current detection circuit 311, and except for an operational principle as explained in the following.

When a probe electrode 31 is put very close to a recording medium 34, a cantilever beam 32 is bent by a force acting between the probe electrode 31 and a surface of the recording medium, which is an interatomic force. An amount of bending is optically detected. A laser beam is guided from a laser beam source 350 through an optical fiber 351 to a surface of the cantilever beam 32. The laser beam irradiating the surface of the cantilever 32 is reflected thereon to be received by a bisectional photo sensor 352. A comparator 353 compares outputs from two detection elements with each other to obtain a deviation of the reflected beam, whereby enabling to detect a flexure of the cantilever beam 32. This is a technique as so-called as an optical lever method. The measurement of flexure is not limited to the optical lever method. For example, the optical interference may be employed for the measurement, or techniques other than such optical methods may be applicable. One of techniques other than the optical methods is a mechanism for detecting the flexure of cantilever beam provided on the beam itself.

The microcomputer 36 preliminarily stores z coordinates as designed values or as measured values, which are taken if x, y coordinates of each probe electrode tip and a control voltage of each probe moving mechanism are zero and if the force acting between the each probe electrode and the recording medium surface is substantially zero. The microcomputer 39 also preliminarily stores as designed values or as experimented values a relation between a control voltage to each probe moving mechanism and a flexure amount of a cantilever beam 32 (deviation-voltage characteristics) and a relation between a probe electrode-recording medium surface interaction force and a flexure amount of a cantilever beam 32 (displacement-working force characteristics).

An approach procedure of the probe electrodes is as follows similarly as In the sixth embodiment except that the current detection is replaced with the force detection or flexure detection of cantilever beam. Operational steps are conducted based on a command from the microcomputer 39. Initially, the medium coarse movement mechanism 37 makes the recording medium coarsely approaching the support to a certain extent within a distance at which no cantilever beam has a flexure, and then the medium fine movement mechanism 35 finely decreases a spacing between the recording medium and the support of the probe electrode group. During the approach, individual flexures of the cantilever beams are detected which deviate the respective m×n (=N) of probe electrodes. A value of flexure of each cantilever beam gradually increases as it approaches the recording medium. Once either one of the cantilever beams first has a flexure exceeding a preset threshold level, the approach of the recording medium by the medium fine movement mechanism 35 is temporarily stopped. Then a control voltage for the probe moving mechanism corresponding to the cantilever beam with the flexure exceeding the threshold level is controlled to make only the probe electrode retreat by a predetermined distance. After that, the approach of the recording medium is again started towards the probe electrode group. Out of the rest of the probe electrodes excluding the retreated probe electrode, another probe electrode which next first exceeds the threshold level is made to retreat likewise. The recording medium then again starts approaching. Repeating this step, the recording medium is stopped approaching when all cantilever beams for the m×n of probe electrodes have respective flexures exceeding the threshold level.

After the stop of approach, the control voltages for the respective probe moving mechanisms are individually adjusted monitoring flexures of cantilever beams displacing the respective probe electrodes with the bisectional photo sensor 352. The adjustment is conducted as follows. A deviation of flexure amount is detected with respect to an amount of flexure by which a cantilever beam is to be bent with a current control voltage with no acting force, referring to a relation between a control voltage to the each probe moving mechanism and a flexure amount of cantilever beam which has been sought in a state of no acting force between the medium and a probe electrode, as well as to the control voltage which is currently applied to the probe electrode. The deviation is due to a force acting between the medium and the probe electrode, which follows deviation-acting force characteristics stored. The microcomputer 39 calculates a deviation amount when a predetermined force acts which has uniformly been set for all probe electrodes based on the characteristics. A control voltage to each probe moving mechanism is adjusted to have that deviation amount. After completion of the adjustment, the respective states are maintained. By this adjustment, all distances between the probe electrode tips and the recording medium are kept equal.

Although a surface of medium is usually a curved surface, the thus-achieved state is equivalent to such a state that a medium surface is planar and that all probe tips align on an identical plane while the both planes face in parallel with each other. Therefore, considering a new coordinate system (u, v, w) in which w coordinate is defined as a position of the z-directional deviation from each of the thus-achieved states of the respective probe electrodes, that is, from w=0, at a position of probe electrode tip in the above state, and in which u and v coordinates are similarly defined corresponding to x, y coordinates of the respective probe electrodes, the spacing adjustment reaches a problem to let two planes oppose in parallel for a general medium surface. In other words, the medium surface may be assumed as a plane in the (u, v, w) coordinate system.

From outputs of the bisectional photo sensor, deviation amounts of the respective probe electrodes are obtained with respect to positions in the non-driving states of the probe moving mechanisms and with no acting force. After multiplying the obtained deviation amounts by −1, all values are stored as w coordinates upon no driving of the probe electrode tips without acting force thereon.

A virtual plane may in general be represented by the following equation in the (u, v, w) coordinate system.

$$w = f(u, v) = au + bv + c \quad (1)$$

Using the w coordinates of the respective probe electrodes as obtained above, the following summation is sought.

$$S = \sum_{i}^{N} \{w_i - f(u_i, v_i)\}^2 \quad (\text{Eq. 2})$$

The summation is taken over the m×n(=N) of probe electrodes. Values a, b, c are next calculated to make S minimum. Such values may be obtained by solving the following simultaneous equations.

$$\partial S/\partial a = 0 \quad (3)$$

$$\partial S/\partial b = 0 \quad (4)$$

$$\partial S/\partial c = 0 \quad (5)$$

A virtual plane (L) represented by equation (Eq.1) is determined with the thus-obtained values a, b, e. The determined plane is a plane which minimizes a sum of squares of w-directional deviation amounts of the respective probe electrode tips from the virtual plane, taken over all the probes. If both a and b are zero, it can be assumed that the medium surface is located at a position to minimize the sum of squares of the deviation amounts of the respective probe electrodes with respect to the support of the probe electrodes. However, if either one of a and b is not zero, the medium surface is assumed to be inclined with respect to the support of the probe electrodes.

When the medium surface is assumed to be inclined with respect to the support of the probe electrodes, the inclination is compensated for by driving either the medium fine movement mechanism 35 or the medium coarse movement mechanism 37. The following is a specific example of the compensation, which is conducted in the same manner as in the sixth embodiment. In case that a means for changing the inclination is three piezo-electric devices independently displaced, using the above equation (Eq.1) with u and v coordinates equivalent to x and y coordinates and preliminarily obtained for the three devices, w coordinates are obtained at the u, v coordinates to make the medium surface in parallel with the above plane. The microcomputer 39 calculates w-directional movement amounts necessary for making them identical, for the respective piezo-electric devices. The microcomputer 39 sends a command signal in accordance with the moving amounts to the coarse movement control circuit 38 or to the fine movement control circuit 36 to displace the respective piezo-electric devices.

The above step is repeated if necessary as in the sixth embodiment, whereby adjusting the inclination between the facing planes of the recording medium and the probe electrode support so as to minimize the sum of squares of probe deviation amounts and so as to locate the virtual plane L and the medium surface in parallel with each other in the (u, v, w) coordinate system after spacing adjustment as described below.

The spacing adjustment is effected as follows. First obtained is an average $w_0$ of all w coordinates of the probe electrode tips stored in the microcomputer 39. While a spacing between the respective probe electrode tips and the recording medium is adjusted to a value corresponding to the above-mentioned threshold level with a command signal from the microcomputer, the recording medium is moved by $-w_0$ either by the medium fine movement mechanism 35 or by the medium coarse movement mechanism 37 in the w-direction without changing the inclination. While again monitoring reflection beams from the respective probe electrodes in that state with the bisectional photo sensors 352, control voltages for the respective probe moving mechanism are varied. Once the deviation of flexure amount of the each cantilever beam from that with no acting force becomes equivalent to the predetermined threshold level, respective control voltages in that moment are held. By this, the control voltages for the respective probe moving mechanisms may be distributed around zero, which is in a non-driven state of the probe moving mechanisms, and the sum of squares of deviation amounts over all probe moving mechanisms may be minimized.

The following modification may be employed instead of the above probe approaching method in the seventh embodiment. Without using the fine movement mechanism 35 and the coarse movement mechanism 37, an identical drive voltage is applied to all the probe moving mechanisms to put the respective probe electrode tips uniformly closer to the recording medium surface. After that, the same procedure as in the seventh embodiment may be taken.

After completion of the adjustment following the above procedure, if a distance between a probe electrode and the medium is fluctuated, a force acting between them will change with the fluctuation. The microcomputer 39 executes a feedback control of the probe moving mechanism based on the deviation of flexure of cantilever beam due to the fluctuation of force from the preset threshold level, maintaining the distance between them constant.

An operation of recording (erasing) or reproducing is carried out after position alignment while keeping the recording medium and the probe electrode tips in the approached state with each other in the above procedure. In the present embodiment, a bias voltage is not specially required for writing. The threshold level of the force acting between the probe electrodes and the medium was set as $1\times10^{-8}$N. Driving the recording medium in the xy plane, a writing pulse train, for example of (b) in FIG. 22 which was produced based on individual bit information for example of (a) in FIG. 22 as information for one probe electrode, was applied to the probe electrode. The first bit of the bit information is always a bit corresponding to the ON state for all bit information.

After the application of pulses, the recording medium was again driven in the xy plane in the same manner as upon the writing, and a current flowing between each of the probe electrodes and the medium was measured under the condition of application of bias voltage of 0.1 V. A change in current of four digits was observed at each position of pulse applied in each probe electrode. The obtained current measurement values were made two-valued with a proper threshold level to restore a pulse train for each probe electrode, which was coincident with the individual bit information (for example of (a) in FIG. 22) applied to the each probe electrode.

An erasing pulse train for example of (c) in FIG. 22 was produced based on each of the individual bit information written in the above step. The first bit was set to keep in the ON state without erasing for all bit information. Driving the recording medium in the xy plane in the same manner as upon the writing, a current was measured, and the drive of medium was temporarily stopped at a position of first bit, i.e., at a position at which the current value first changes by four digits. All the probe electrodes showed the change of four digits as first defined as bit information. Then the medium was again driven, and corresponding individual erasing pulse trains were applied for the individual probe electrodes in synchronism with the drive of medium. The recording medium was again driven in the xy plane in the same manner as upon the writing to measure currents. All the bits except the first bit were in the OFF state, that is, showed current values of about $1\times10^{-10}$A, confirming completion of erasing.

Instead of the erasing pulse as used, another erasing pulse train, for example of (d) in FIG. 22 in which an arbitrary bit excluding the first bit out of the written bit information was selected to be in the ON state, was produced for all other erasing test similarly as in the above-described procedure. It was observed in this erasing test that only the selected bit was erased.

An eighth embodiment as described below uses the apparatus of the seventh embodiment. In the eighth embodiment, an identical bias voltage is applied to each of probe electrodes upon approach of probe electrodes, a flexure of a cantilever beam is detected in the optical lever method, a current flowing between each probe electrode and a recording medium is measured, relations are obtained between a distance between the medium and each probe electrode, and a current, and between the distance and a force, and they are stored in a microcomputer 39. This arrangement allows one to obtain a force acting between the medium and each probe electrode from a current flowing between them.

The probe electrodes are then let to approach the medium only by monitoring a current flowing between the probe electrodes and the medium without detecting flexures of cantilever beams in the optical lever method. During the approach, a bias voltage is applied to each of the probe electrodes, which is the same bias voltage as that used for obtaining the relations of force and current. The procedure of approach of probe electrodes is the same as in the sixth embodiment, but a threshold level current used is set to a value corresponding to a predetermined force preliminarily set. Specifically, it is conducted as follows.

A predetermined bias voltage is first applied by the voltage application circuit 312 identically to all the probe electrodes. Monitoring currents flowing through the respective probe electrodes, the medium coarse movement mechanism 37 makes the recording medium coarsely approaching the support to a certain extent, within a distance at which no current flows through the probe electrode, and then the medium fine movement mechanism 35 finely decreases a spacing between the recording medium and the support of the probe electrode group. During the approach, the current detection circuit 311 individually detects currents flowing through the respective m×n(=N) of probe electrodes. A value of current flowing through each probe electrode gradually increases as it approaches the recording medium. Once either one of the probe electrodes 31 first has a current exceeding a preset threshold level, the approach of the recording medium by the medium fine movement mechanism 35 is temporarily stopped. Then a control voltage for the probe moving mechanism corresponding to the probe electrode with the current exceeding the threshold level is controlled to make only the probe electrode retreat by a predetermined distance. After that, the approach of the recording medium is again started towards the probe electrode group. Out of the rest of the probe electrodes excluding the retreated probe electrode, another probe electrode which next first exceeds the threshold level is made to retreat likewise. The recording medium then again starts approaching. Repeating this step, the recording medium is stopped approaching when all the m×n of probe electrodes have respective currents exceeding the threshold level.

After the stop of approach, the control voltages for the respective probe moving mechanisms are so adjusted as to equalize the currents flowing through the respective probe electrodes to the threshold level. The respective states are maintained thereafter. By this adjustment, all distances between the probe electrode tips and the recording medium are kept equal.

Although a surface of medium is usually a curved surface, the thus-achieved state is equivalent to such a state that a medium surface is planar and that all probe tips align on an identical plane while the both planes face in parallel with each other. Therefore, considering a new coordinate system (u, v, w) in which w coordinate is defined as a position of the z-directional deviation from each of the thus-achieved states of the respective probe electrodes, that is, from w=0, at a position of probe electrode tip in the above state, and in which u and v coordinates are similarly defined corresponding to x, y coordinates of the respective probe electrodes, the spacing adjustment reaches a problem to let two planes oppose in parallel for a general medium surface. In other words, a medium surface may be assumed as a plane in the (u, v, w) coordinate system. From outputs of the bisectional photo sensors, deviation amounts of the respective probe electrodes are obtained with respect to positions in the non-driving states of the probe moving mechanisms without acting forces thereon. After multiplying the obtained deviation amounts by −1, all values are stored as w coordinates upon no driving of the probe electrode tips with no acting forces.

A virtual plane may in general be represented by the following equation in the (u, v, w) coordinate system.

$$w=f(u, v)=au+bv+c \tag{1}$$

Using the w coordinates of the respective probe electrodes as obtained above, the following summation is obtained.

$$S = \sum_{i}^{N} \{w_i - f(u_i, v_i)\}^2 \quad \text{(Eq. 2)}$$

The summation is taken over the m×n(=N) of probe electrodes. Values a, b, c are next sought to make S minimum. Such values may be obtained by solving the following simultaneous equations.

$$\partial S/\partial a = 0 \quad (3)$$

$$\partial S/\partial b = 0 \quad (4)$$

$$\partial S/\partial c = 0 \quad (5)$$

A virtual plane (L) represented by equation (Eq.1) is determined with the thus-obtained values a, b, c. The determined plane is a plane which minimizes a sum of squares of w-directional deviation amounts of the respective probe electrode tips from the plane, taken over all the probes. If both a and b are zero, it can be assumed that the medium surface is located at a position to minimize the sum of squares of the deviation amounts of the respective probe electrodes with respect to the support of the probe electrodes. However, if either one of a and b is not zero, the medium surface is assumed to be inclined with respect to the support of the probe electrodes.

When the medium surface is assumed to be inclined with respect to the support of the probe electrodes, the inclination is compensated for by driving either the medium fine movement mechanism 35 or the medium coarse movement mechanism 37. The following is a specific example of the compensation as in the sixth and the seventh embodiments. In a case that a means for changing the inclination is three piezo-electric devices independently displaced, using the above equation (Eq.1) with u and v coordinates equivalent to x and y coordinates and preliminarily obtained for the three devices, w coordinates are obtained at the u, v coordinates to make the medium surface in parallel with the above plane. The microcomputer 39 calculates w-directional movement amounts necessary for making them identical, for the respective piezo-electric devices. The microcomputer 39 sends a command signal in accordance with the moving amounts to the coarse movement control circuit 38 or to the fine movement control circuit 36 to displace the respective piezo-electric devices.

The above step is repeated if necessary as in the previous embodiments, whereby adjusting the inclination between the facing planes of the recording medium and the probe electrode support so as to minimize the sum of squares of probe deviation amounts and so as to locate the virtual plane L and the medium surface in parallel with each other in the (u, v, w) coordinate system after spacing adjustment as below described.

The spacing adjustment is effected as follows. First obtained is an average $w_0$ of all w coordinates of the probe electrode tips stored in the microcomputer 39. While a spacing between the respective probe electrode tips and the recording medium is adjusted to a value corresponding to the above-mentioned threshold level with a command signal from the microcomputer, the recording medium is moved by $-w_0$ either by the medium fine movement mechanism 35 or by the medium coarse movement mechanism 37 in the w-direction without changing the inclination. While again monitoring currents flowing the respective probe electrodes in that state, control voltages for the respective probe moving mechanism are varied. Once the currents flowing through the respective probe electrodes become equivalent to the threshold level, respective control voltages in that moment are held. By this, the control voltages for the respective probe moving mechanisms may be distributed around zero, which is a non-driven state of the probe moving mechanisms, and the sum of squares of deviation amounts over all probe moving mechanisms may be minimized.

The following modification may be employed instead of the above probe approaching method in the eighth embodiment. Without using the fine movement mechanism 35 and the coarse movement mechanism 37, an identical drive voltage is applied to all the probe moving mechanisms within a range in which a current does not exceed the threshold level between each of the probe electrodes and the medium surface, to put the respective probe electrode tips uniformly closer to the recording medium surface. After that, the same procedure as in the eighth embodiment may be taken.

After completion of the adjustment following the above procedure, if a distance between a probe electrode and the medium is fluctuated, a force acting between them will change with the fluctuation. The microcomputer 39 executes a feedback control of the probe moving mechanisms based on the deviation of force from the preset threshold level obtained either by the bisectional photo sensor or by the current detection circuit, maintaining the distance between them constant. In such a state that the probe electrodes approach the medium as to have repulsive forces between them, distances between them may be maintained without such a feedback control.

An operation of recording (erasing) or reproducing is carried out after position alignment while keeping the recording medium and the probe electrode tips in the approached state with each other in the above procedure. A bias voltage of 0.1 V was applied to all the probe electrodes, and the preset threshold level of current was $10^{-9}$ A corresponding to the region α in FIG. 3. There were repulsive forces acting between the probe electrodes and the medium, and the distances between them might be maintained constant without feedback control. Driving the recording medium in the xy plane, a writing pulse train, for example of (b) in FIG. 22 which was produced based on individual bit information for example of (a) in FIG. 22 as information for one probe electrode, was applied to each of the probe electrodes. The first bit of the bit information is always a bit corresponding to the ON state for all bit information.

After the application of pulses, the recording medium was again driven in the xy plane in the same manner as upon the writing, a current flowing between each of the probe electrodes and the medium was measured under the condition of application of bias voltage of 0.1 V. A change in current of four digits was observed at each position of pulse applied in each probe electrode. The obtained current measurement values were made two-valued with a proper threshold level to restore a pulse train for each probe electrode, which was coincident with the individual bit information (for example of (a) in FIG. 22 applied to each probe electrode).

An erasing pulse train, for example of (c) in FIG. 22, was produced based on each of the individual bit information written in the above step. The first bit was set to keep in the ON state without erasing for all bit information. Driving the recording medium in the xy plane in the same manner as upon the writing, a current was measured, and the drive of medium was temporarily stopped at a position of first bit, i.e., at a position at which the current value first changes by four digits. All the probe electrodes showed the change of four digits as first defined as bit information. Then the medium was again driven, and corresponding individual erasing pulse trains were applied for the individual probe electrodes in synchronism with the drive of medium. The recording medium was again driven in the xy plane in the same manner as upon the writing to measure currents. All the bits except the first bit were in the OFF state, that is, showed current values of about $10^{-9}$A, confirming completion of erasing.

Instead of the erasing pulse as used, another erasing pulse train, for example of (d) in FIG. 22 in which an arbitrary bit excluding the first bit out of the written bit information was selected to be in the ON state, was produced for another erasing test similarly as in the above-described procedure. It was observed in this erasing test that only the selected bit was erased.

The above-described recording/reproducing apparatus in the respective embodiments may be arranged as an apparatus only for recording or only for reproducing.

A microscope may be arranged for observing a surface of specimen in the same manner as upon the reproducing, by replacing the above-described recording medium with a specimen.

A ninth embodiment of the present invention is next explained.

The ninth embodiment uses the above-described apparatus of the sixth embodiment as shown in FIG. 20. Therefore, the explanation of the apparatus is omitted here.

Figure 24B:
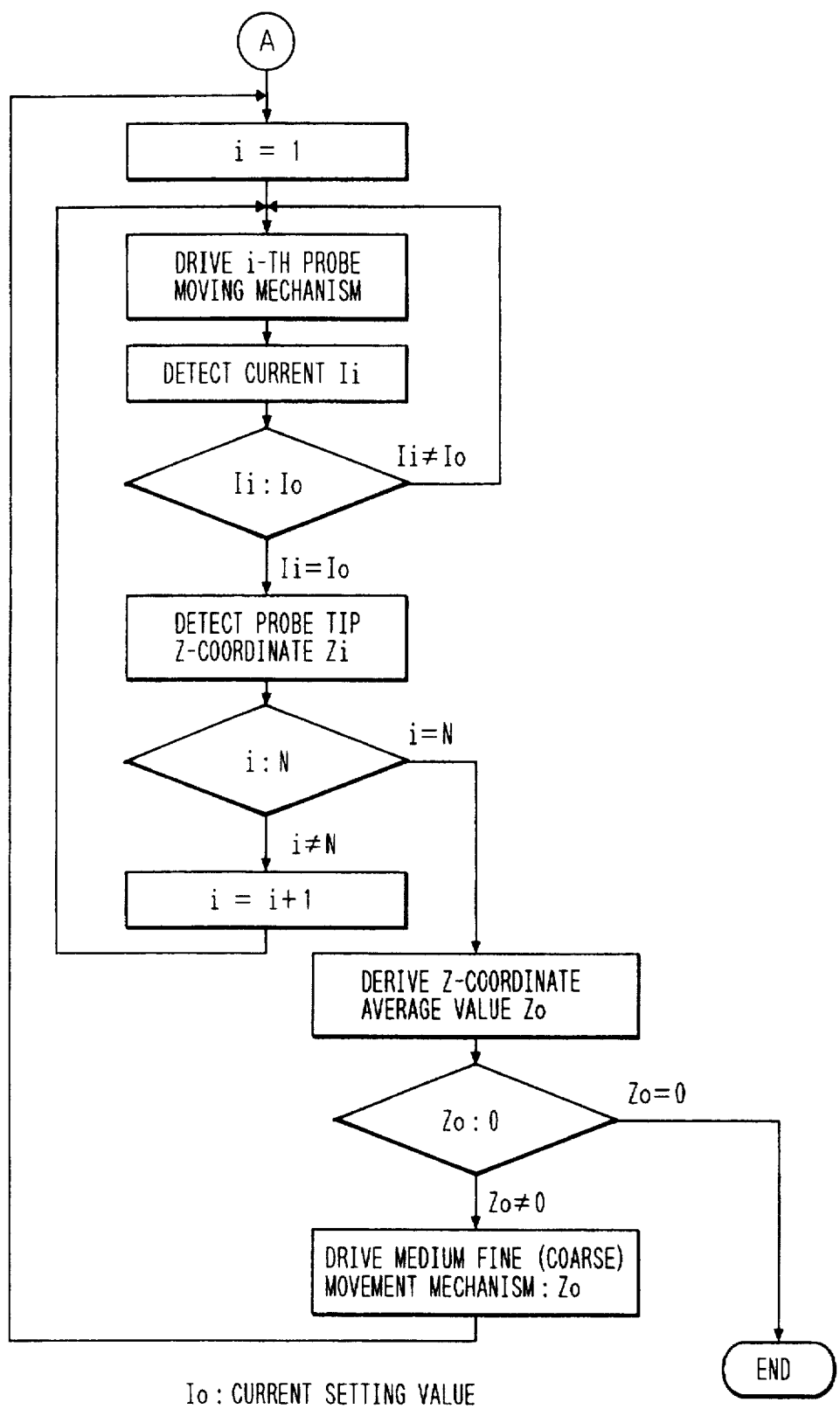
FIG. 24, which is comprised of FIGS. 24A and 24B, is a flowchart to illustrate an operation in a ninth embodiment.

An operation of the ninth embodiment is explained in the following with reference to the apparatus as shown in FIG. 20 and a flowchart as shown in FIG. 24.

Operational steps in the flowchart as shown in FIG. 24 are carried out based on a command from a microcomputer 39. An identical predetermined bias voltage is first applied to all probe electrodes. Monitoring a current flowing through each probe electrode, a recording medium is moved by a medium coarse movement mechanism 37 to coarsely approach the probe electrode group to a certain extent, and then a spacing between the recording medium and a support of the probe electrode group is gradually decreased by a medium fine movement mechanism 35 to put them closer to each other. During the approach, a current detection circuit 311 individually detects a current flowing through each of m×n of probe electrodes. A current value flowing through each probe electrode gradually increases as the medium approaches the probe electrode group. When one of probe electrodes first has a current exceeding a preset threshold level, the approach of the recording medium is temporarily stopped. A control voltage is controlled for a probe moving mechanism corresponding to the probe electrode with the current exceeding the threshold level to make the probe electrode retreat by a predetermined distance, i.e., to move the probe electrode away from the recording medium surface. After that, the recording medium again starts approaching the probe electrode group. Out of the rest of probe electrodes excluding the thus-retreated probe electrode, the next one of probe electrodes first exceeding the threshold level is similarly made to retreat, and then the recording medium again starts approaching. Repeating this step, the approach of the recording medium is stopped when all currents flowing through respective m×n of probe electrodes exceed the threshold level.

After the stop of the medium, control voltages for the respective probe moving mechanisms are adjusted such that currents flowing through the respective probe electrodes become equivalent to the threshold level, and the thus-adjusted state is maintained. By this, all distances between the respective probe electrode tips and the recording medium are kept equal.

All z coordinates of the respective probe electrode tip positions are next obtained from the control voltages applied to the respective probe moving mechanisms and maintained. The coordinate system is defined in the same manner as in the sixth embodiment. The thus-obtained z coordinates are stored, and an average value of all the z coordinates of the probe electrodes is obtained as $z_0$.

The average value $z_0$ is negative, because all z coordinates of the probe electrode tips are zero or negative in the state that all the probe electrodes approach the recording medium surface in the above steps.

In order to make the average value $z_0$ zero, the recording medium is moved $|z_0|$ away from the probe electrodes either by the medium fine movement mechanism 35 or by the medium coarse movement mechanism 37. In this state, the control voltages for the respective probe moving mechanisms are again changed monitoring currents flowing through the respective probe electrodes. When a current flowing through a probe electrode reaches the threshold level, a control voltage at that point is maintained. By this, all coordinates of the probe electrode tip positions may be made zero, and the control voltages for the respective probe moving mechanisms may be distributed around zero, where the probe moving mechanisms are in a non-driven state.

Such a modification may be employed in the probe approach method of the ninth embodiment that, without using the fine movement mechanism 35 and the coarse movement mechanism 37, an identical drive voltage is applied to all the probe moving mechanisms, that the probe electrode tips are uniformly put closer to the recording medium surface to a certain extent, and thereafter that the same steps as in the ninth embodiment are carried out.

If a distance between a probe electrode and the recording medium fluctuates for some reason after the operation of the above steps, a current flowing between them also fluctuates with the fluctuation of distance. The distance between them may always be kept constant with a feedback control of the probe moving mechanisms in accordance to the deviation of current from a preset threshold level.

A recording and reproducing operation to follow is the same as in the sixth embodiment.

A tenth embodiment of the present invention is explained in the following.

The tenth embodiment is the same as the ninth embodiment except that the current detection is replaced with detection of force, i.e., with detection of flexure of cantilever beam.

The following is an operation of the tenth embodiment.

Operational steps as explained are carried out based on a command from a microcomputer 39. A recording medium is moved by a medium coarse movement mechanism 37 to coarsely approach the probe electrode group to a certain extent, and then a spacing between the recording medium and a support of the probe electrode group is gradually decreased by a medium fine movement mechanism 35 to put them closer to each other. During the approach, individual flexures of cantilever beams are individually detected for respective m×n of probe electrodes. A flexure of each cantilever beam gradually increases as the medium approaches the probe electrode group. When one of cantilever beams first has a flexure exceeding a preset threshold level, the approach of the recording medium is temporarily stopped. A control voltage is controlled for a probe moving mechanism corresponding to the cantilever beam with the flexure exceeding the threshold level to make the probe electrode retreat by a predetermined distance. After that, the recording medium again starts approaching the probe electrode group. Out of the rest of probe electrodes excluding the thus-retreated probe electrode, the next one of probe electrodes first exceeding the threshold level is similarly made to retreat, and then the recording medium again starts approaching. Repeating this step, the approach of the recording medium is stopped when all flexures of cantilever beams respectively displacing the m×n of probe electrodes exceed the threshold level.

Monitoring flexures of the respective cantilever beams respectively displacing the probe electrodes by the detection mechanism as shown in FIG. 23, control voltages to the respective probe moving mechanisms are adjusted to detect deviations from a relation between a flexure of cantilever and a control voltage to a probe electrode, which had preliminarily been obtained in such a state that there is no force acting between the medium and the probe electrode. The deviations are due to forces acting between the medium and the probe electrodes. The control voltages to the respective moving mechanisms are adjusted to cause deviations to be effected when a force of predetermined level is applied. The thus-adjusted states will be maintained. By this, all distances between the respective probe electrode tips and the recording medium may be set equal.

All z coordinates of the respective probe electrode tip positions are next obtained from the control voltages applied to the respective probe moving mechanisms and maintained. The thus-obtained z coordinates are stored, and an average value of all the z coordinates of the probe electrodes is obtained as $z_0$.

The average value $z_0$ is negative, because all z coordinates of the probe electrode tips are zero or negative in the state that all the probe electrodes approach the recording medium surface in the above steps.

In order to make the average value $z_0$ zero, the recording medium is moved away from the probe electrodes by $|z_0|$ either by the medium fine movement mechanism 35 or by the medium coarse movement mechanism 37. In this state, the control voltages for the respective probe movement mechanisms are again changed monitoring flexures of the respective cantilever beams. When a force acting between a probe electrode and the medium reaches the predetermined level, a control voltage at that point is maintained. By this, all coordinates of the probe electrode tip positions may be made zero, and the control voltages for the respective probe moving mechanisms may be distributed around zero, where the probe moving mechanisms are in a non-driven state.

Such a modification may be employed in the probe approach method of the above embodiment that, without using the fine movement mechanism 35 and the coarse movement mechanism 37, an identical drive voltage is applied to all the probe moving mechanisms, that the probe electrode tips are uniformly put closer to the recording medium surface to a certain extent, and thereafter that the same steps as in the above embodiment are carried out.

If a distance between a probe electrode and the recording medium fluctuates for some reason after the operation of the above steps, a force acting between them also fluctuates with the fluctuation of distance. The distance between them may always be kept constant with a feedback control of the probe moving mechanisms in accordance to the deviation of flexure of cantilever beam due to the fluctuation of force from a preset threshold level.

A recording and reproducing operation to follow is the same as in sixth embodiment.

An eleventh embodiment of the present invention is explained in the following.

With reference to the tenth embodiment as above explained, during the approach of probe electrodes, an identical bias voltage is applied to the probe electrodes, a flexure of each cantilever beam is detected in the optical lever method, and a current flowing between each probe electrode and a recording medium is measured at the same time, whereby obtaining a relation between a current and a force to a distance between the medium and the probe electrodes as shown in FIG. 3. Using the relation, a force acting between a probe electrode and the medium may be obtained from a current flowing between the probe electrode and the medium.

Then, without detection of flexure of cantilever beams in the optical lever method, the approach of the probe electrodes is conducted to the recording medium only monitoring currents flowing between the probe electrodes and the medium. A bias voltage applied to the probe electrodes during the approach is set to that used when the relation between the force and the current was obtained. The procedure of approach of the probe electrodes is the same as in the ninth embodiment, in which a threshold level current is set to a value corresponding to a predetermined force. An identical predetermined bias voltage is first applied to all probe electrodes. Monitoring a current flowing through each probe electrode, a recording medium is moved by a medium coarse movement mechanism 37 to coarsely approach the probe electrode group to a certain extent, and then a spacing between the recording medium and a support of the probe electrode group is gradually decreased by a medium fine movement mechanism 35 to put them closer to each other. During the approach, a current detection circuit 311 individually detects a current flowing through each of m×n of probe electrodes. A current value flowing through each probe electrode gradually increases as the medium approaches the probe electrode group. When one of probe electrodes first has a current exceeding a preset threshold level, the approach of the recording medium is temporarily stopped. A control voltage is controlled for a probe moving mechanism corresponding to the probe electrode with the current exceeding the threshold level to make the probe electrode retreat by a predetermined distance. After that, the recording medium again starts approaching the probe electrode group. Out of the rest of probe electrodes excluding the thus-retreated probe electrode, the next one of the probe electrodes first exceeding the threshold level is similarly made to retreat, and then the recording medium again starts approaching. Repeating this step, the approach of the recording medium is stopped when all currents flowing through respective m×n of probe electrodes exceed the threshold level.

After the stop of the medium, control voltages for the respective probe moving mechanisms are adjusted such that currents flowing through the respective probe electrodes become equivalent to the threshold level, and the thus-adjusted state is maintained. By this, all distances between the respective probe electrode tips and the recording medium are kept equal.

All z coordinates of the respective probe electrode tip positions are next obtained from the control voltages applied to the respective probe moving mechanisms and maintained. The thus-obtained z coordinates are stored, and an average value of all the z coordinates of the probe electrodes is obtained as $z_0$.

The average value $z_0$ is negative, because all z coordinates of the probe electrode tips are zero or negative in the state that all the probe electrodes approach the recording medium surface in the above steps.

In order to make the average value $z_0$ zero, the recording medium is moved away from the probe electrodes by $|z_0|$ either by the medium fine movement mechanism 35 or by the medium coarse movement mechanism 37. In this state, the control voltages for the respective probe movement mechanisms are again changed monitoring currents flowing through the respective probe electrodes. When a current flowing through a probe electrode reaches the threshold level, a control voltage at that point is maintained. By this, all coordinates of the probe electrode tip positions may be made zero, and the control voltages for the respective probe moving mechanisms may be distributed around zero, where the probe moving mechanisms are in a non-driven state.

Such a modification may be employed in the probe approach method of the above embodiment that, without using the fine movement mechanism 35 and the coarse movement mechanism 37, an identical drive voltage is applied to all the probe moving mechanisms, that the probe electrode tips are uniformly put closer to the recording medium surface to a certain extent, and thereafter that the same steps as in the above embodiment are carried out.

If a distance between a probe electrode and the recording medium fluctuates for some reason after the operation of the above steps, a force acting between them also fluctuates with the fluctuation of distance. The distance between them may always be kept constant with a feedback control of the probe moving mechanisms in accordance to the deviation from a force of predetermined level. In such a state that the probe electrodes approach the medium to have repulsive forces, distances between the probe electrodes and the medium may be kept constant without such a feedback control.

A recording and reproducing operation to follow is the same as in sixth embodiment.

A twelfth embodiment of the present invention is next explained.

Figure 25:
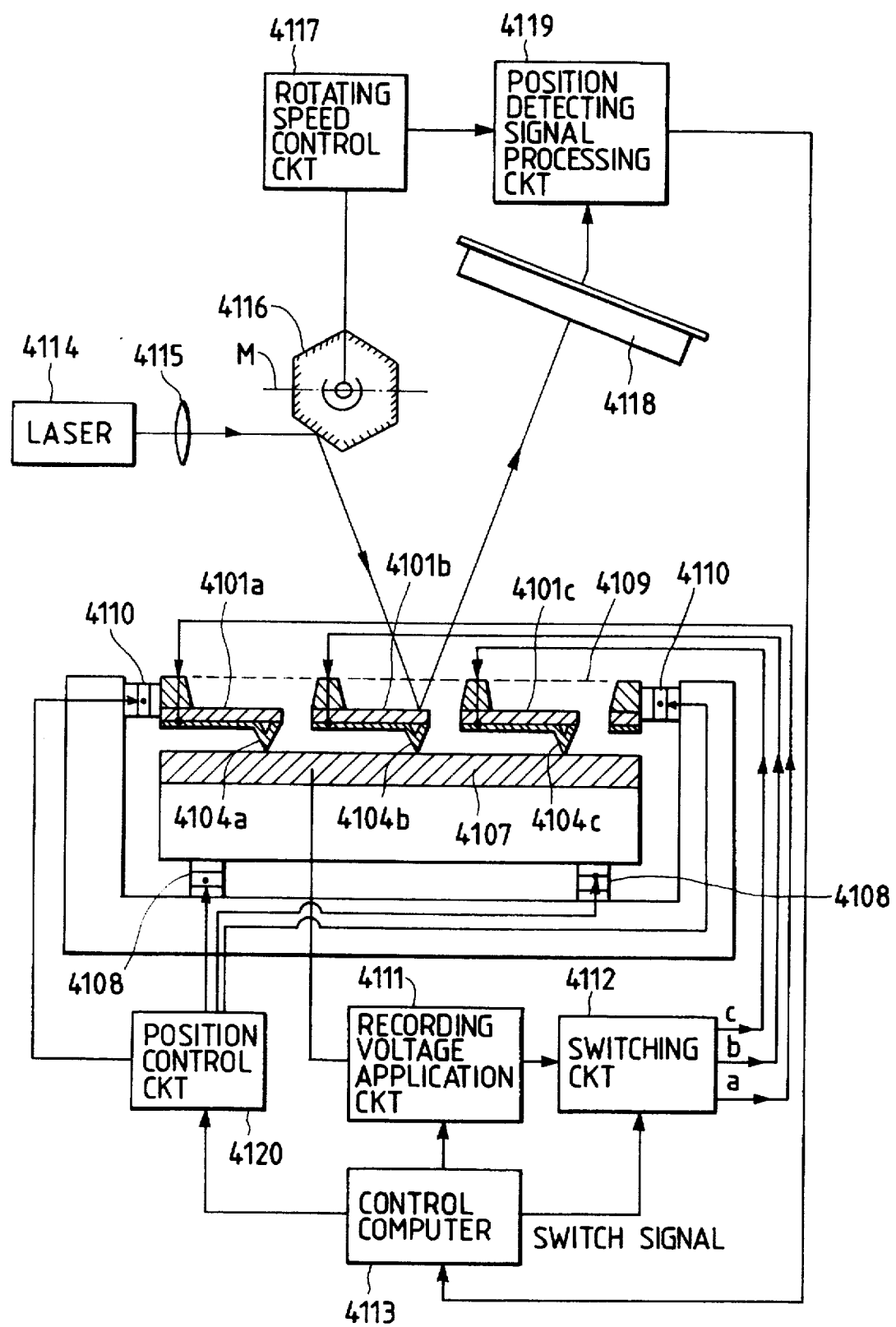
FIG. 25 is a drawing of entire structure to show a twelfth embodiment of the information recording/reproducing apparatus according to the present invention.

FIG. 25 is a drawing to show the twelfth embodiment of the present invention. In FIG. 25, a plurality of cantilevers of elastic material 4101a, 4101b, 4101c, ..., only three of which are shown, respectively support a plurality of conductive probe electrodes 4104a, 4104b, 4104c, ..., only first three of which are shown, facing a recording medium 4107. Numeral 4108 denotes a vertical drive element for driving the recording medium 4107 vertically in FIG. 25, 4109 a cantilever support member supporting the cantilevers 4101a, 4101b, 4101c, ..., and 4110 a horizontal drive element for horizontally driving the cantilever support member 4109 left and right in FIG. 25, and, into and out of the drawing. FIG. 25 shows only a left-and-right drive element. The drive elements 4108, 4110 are controlled in driving by a position control circuit 4120. Numeral 4111 designates a recording voltage application circuit for generating a voltage applied for information recording between the medium and the probes, 4112 a switching circuit for applying a voltage from the recording voltage application circuit 4111 between a specific probe electrode selected and the recording medium 4107, 4114 a laser beam source, 4115 a lens for converging a laser beam from the laser beam source 4114 on the cantilevers 4101a, ..., 4116 a polygon mirror for sequentially scanning the respective cantilevers 4101a, 4101b, 4101c, ..., with the laser beam through the lens 4115, 4117 a rotation speed control circuit for controlling the rotation of the polygon mirror 4116 and for generating information output of scan position of laser beam on which cantilever is irradiated, 4118 a position detection circuit for detecting a spot position on an acceptance plane of reflection beam from a cantilever irradiated with the laser beam, and 4119 a position detection signal processing circuit for specifying a cantilever irradiated with the laser beam and for detecting an amount of vertical deviation or flexure of cantilever from outputs of the circuit 4117 and the position detection element 4118. Numeral 4113 denotes a control computer, which generates a position control command signal to the position control circuit 4120 and a command signal corresponding to recording information to the recording voltage application circuit 4111 and the switching circuit 4112, and which receives a signal corresponding to the recording information from the position detection signal processing circuit 4119.

The following is a method for producing the multiple cantilevers respectively having the probe electrodes as used. An Si substrate is subject to thermal oxidation to produce an $SiO_2$ film of 0.3 µm in thickness thereon. A pattern of plural cantilevers is formed on the $SiO_2$ film with each being 100 µm in length and 20 µm in width. A wiring pattern for electric signals to the probe electrodes is then formed, and anisotropic etching is effected on the substrate surface with a KOH solution, forming multiple cantilevers. Probe electrodes are formed in height of 5 µm on respective ends of the cantilevers in the electron beam deposition method of carbon. The thus-produced multi-cantilevers have an elastic constant of about 0.01 N/m to a flexure at the end. Considering bows of individual levers and process errors of a height of the probe electrodes, dispersion of position of tip height of the probe electrodes is about 1 µm with respect to the multi-cantilever support member 4109. The surface of the recording medium has a warp of not more than 1 µm.

While the vertical drive element 4108 moves the recording medium 4107 towards the plural probe electrodes 4104a, 4104b, 4104c, ..., the recording medium 4107 puts a force on the nearest of the plural probe electrodes, then on the second nearest, and so on, up to the farthest at last. One can detect which one of the probe electrodes received a force from the medium as well as an amplitude of the force received, by sensing an amount of flexure of each cantilever. A method for sensing an amount of flexure of cantilever will be below explained. When the medium approaches the probe electrode within a distance of less than 1 nm, there is a force (repulsive force) acting between the medium and the probe electrode. The acting force causes a flexure of cantilever of elastic material supporting the probe electrode. A flexure amount is proportional to an amplitude of the acting force.

Figure 26:
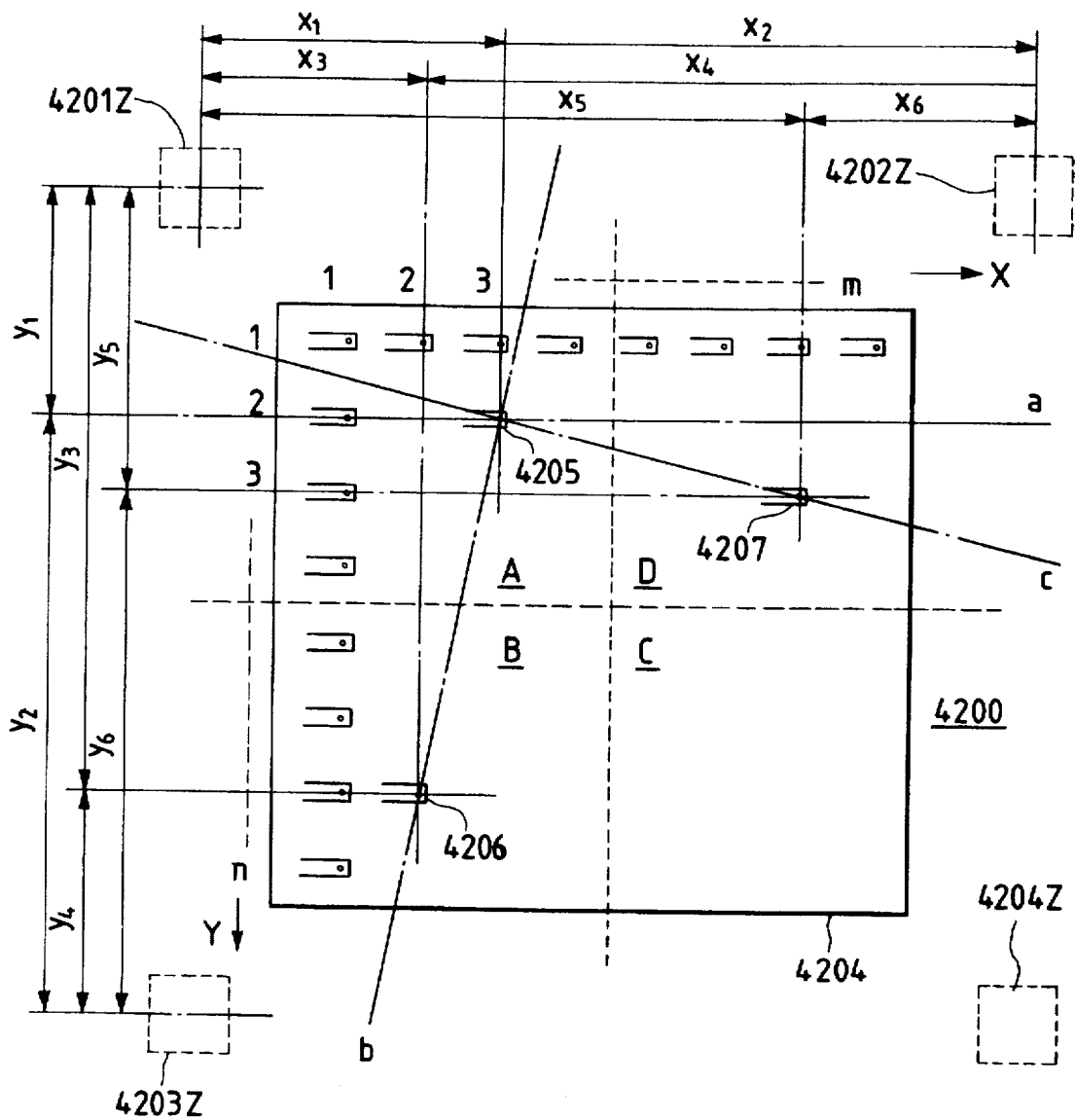
FIG. 26 is a drawing to illustrate an operation of the apparatus of the twelfth embodiment.
Figure 27B:
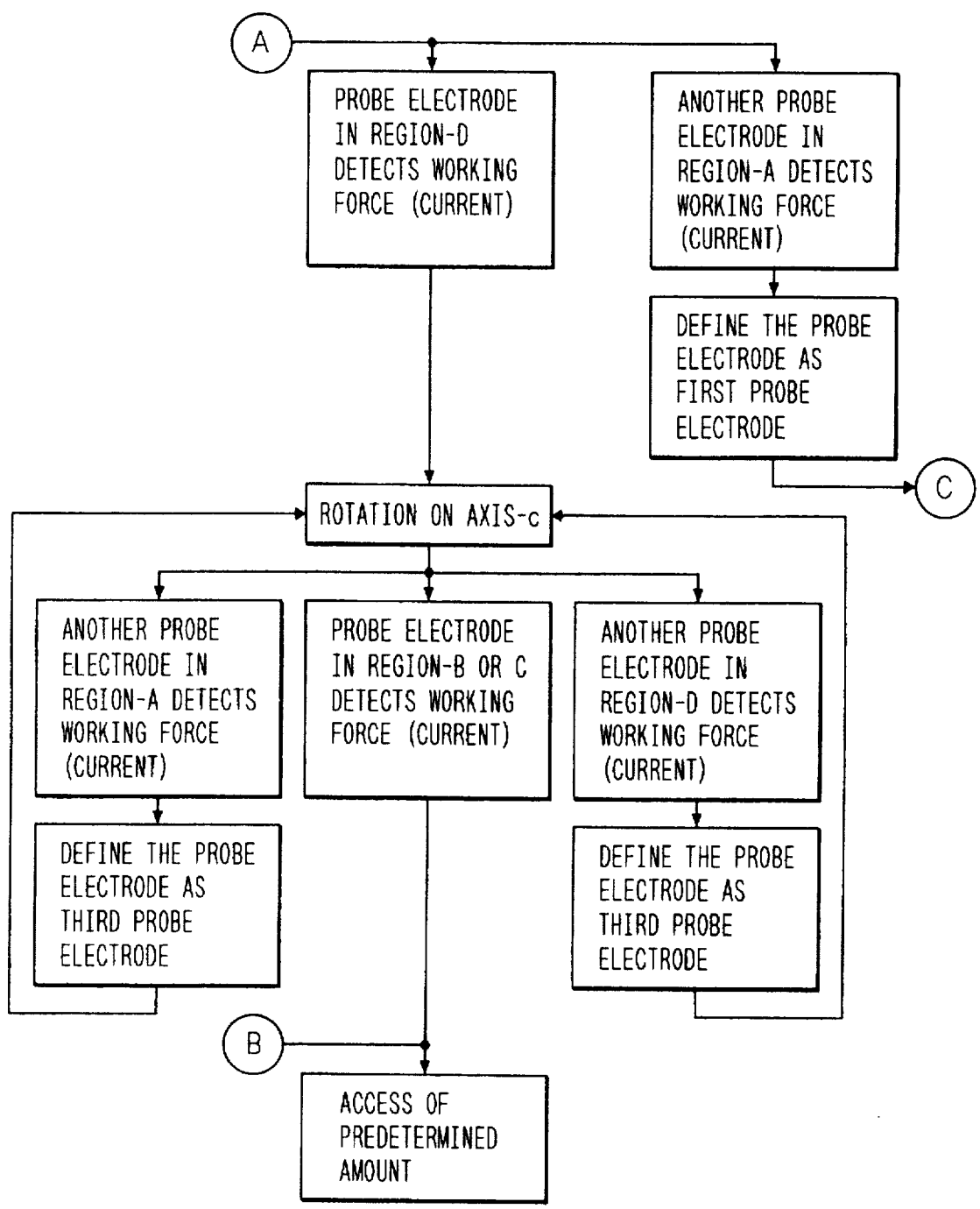
FIG. 27, which is comprised of FIGS. 27A and 27B, is a flowchart to show the operation of the apparatus of the twelfth embodiment.

Next explained with reference to FIGS. 26 and 27 are details of the method for approach of the plural probe electrodes to the recording medium. FIG. 26 is a plan view to illustrate locations of the plural probe electrodes and locations of the vertical drive elements as well as a driving method thereof, and FIG. 27 is a flowchart to show processes for locating them. Vertical driving elements $4201z$, $4202z$, $4203z$ corresponding to the elements 4108 in FIG. 25 are simultaneously driven to move the recording medium 4200, which is separated in the z-direction from the supporting member 4204, relatively close to the multi-cantilever supporting member 4204 corresponding to the support member 4109 in FIG. 25. A first probe electrode 4205 is defined as one of the plural probe electrodes that first approaches the recording medium with detection of acting force. Quartering the plural probe electrodes on the multi-cantilever supporting member into four regions as shown by broken lines in FIG. 26, a region including the first probe electrode 4205 is defined as region A, and others as region B, region C, and region D as shown. Independently driving the drive elements $4201z$, $4202z$, $4203z$, the recording medium 4200 is rotated relative to the multi-cantilever support member 4204 about an axis a passing the probe electrode 4205 and parallel to the x-axis. The rotation is carried out in a direction in which the probe electrodes in regions B and C approach the recording medium. In case that region A includes a second probe electrode which has secondly approached the recording medium with detection of acting force, the second probe electrode is defined as a new first probe electrode. Then a new axis is set passing a tip of the new first probe electrode and parallel to the axis a for rotation as described. In case that region C diagonal to region A includes a second probe electrode which has secondly approached the recording medium with detection of acting force, the drive elements 4201z, 4202z, 4203z are simultaneously driven to make the support member 4204 approach the recording medium by a distance larger than a dispersion of position of tip height of the probe electrodes, for example, approximately by 1 µm in the above example.

In case that region B includes a second probe electrode which has second approached the recording medium with detection of acting force, the probe electrode is defined as a second probe electrode 4206, and the driving elements 4201z, 4202z, 4203z (z1, z2, z3) are independently driven to rotate the multi-cantilever support member 4204 relative to the recording medium about an axis b passing a tip of the first probe electrode 4205 and a tip of the second probe electrode 4206. A rotation direction is taken in such a direction that the probe electrodes in regions C and D approach the recording medium. If region A includes a third probe electrode which has thirdly approached the recording medium with detection of acting force, the probe electrode is defined as a new first probe electrode, while if region B includes a third probe electrode, the probe electrode is defined as a new second probe electrode and an axis b is set for the new second probe electrode to carry out a rotation similarly as in the above example.

Either region C or region D includes a third probe electrode which has thirdly approached the recording medium with detection of acting force, the drive elements 4201z, 4202z, 4203z are simultaneously driven since then to make the support member 4204 approach the recording medium by a distance larger than the dispersion of position of tip height of the probe electrodes, for example, approximately by 1 µm in the above example.

In case that region D includes a second probe electrode which has secondly approached the recording medium with detection of acting force, the probe electrode is defined as a thirdly probe electrode 4207, and the drive elements 4201z, 4202z, 4203z are independently driven to rotate the multi-cantilever support member 4204 relative to the recording medium about an axis c passing a tip of the first probe electrode 4205 and a tip of the thirdly probe electrode 4207. The rotation is effected in such a direction that the probe electrodes in regions B, C approach the recording medium. If region A includes a third probe electrode which has third 14 approached the recording medium with detection of acting force, the probe electrode is defined as a new first probe electrode, while if region D includes a third probe electrode, the probe electrode is defined as a new third probe electrode. In these cases, a new axis c is set for rotation as above.

In case that either region B or region C includes a third probe electrode which has third 14 approached the recording medium with detection of acting force, the drive elements 4201z, 4202z, 4203z are simultaneously driven to make the support member 4204 approach the recording medium by a distance larger than the dispersion of position of tip height of the probe electrodes, for example, approximately by 1 µm in the above example.

Explained in the following are details of the method for rotating the recording medium relative to the multi-cantilever support member 4204 by independently driving the drive elements 4201z, 4202z, 4203z. In FIG. 26, upon the rotation about the axis a, a position of the first probe electrode which has first detected the acting force is detected to calculate a positional relation with the drive elements 4201z, 4202z, 4203z, that is, to calculate distances $x_1$, $x_2$, $y_1$, $y_2$ in FIG. 26. Then, the drive element 4201z is driven in such a direction that the recording medium and the multi-cantilever support member are separated from each other, the drive element 4202z similarly in the direction to separate them, and the drive element 4203z in such a direction that they approach each other, at a ratio of driving amounts of $y_1:y_1:y_2$ to achieve the rotation about the axis a.

For the rotation about the axis b, a position of the second probe electrode which has secondly detected the acting force is detected to calculate a positional relation with the drive elements 4201z, 4202z, 4203z, that is, to calculate $x_3$, $x_4$, $y_3$, $y_4$ in FIG. 26. Then, the drive element 4201z is driven in such a direction that the recording medium and the multi-cantilever support member are separated from each other, the drive element 4202z in such a direction that they approach each other, and the drive element 4203z in the direction to separate them, at a ratio of driving amounts of $$(x_1y_3-x_3y_1):(x_2y_3-x_4y_1):(x_3y_2-x_1y_4)$$

to effect the rotation about the axis b.

Similarly for the rotation about the axis c, a position of the third probe electrode which has secondly detected the acting force is detected to calculate a positional relation with the drive elements 4201z, 4202z, 4203z, that is, to calculate $x_5$, $x_6$, $y_5$, $y_6$ in FIG. 26. Then, the drive element 4201z is driven in such a direction that the recording medium and the multi-cantilever support member are separated from each other, the drive element 4202z in the direction to separate them, and the drive element 4203z in such a direction that they approach each other, at a ratio of driving amounts of $(y_1x_5-y_5x_1):(y_2x_5-y_6x_1):(y_5x_2-y_1x_6)$ to effect the rotation about the axis c.

FIG. 27 shows a flowchart for the above operation.

In the above explanation, a drive element 4204z as shown in FIG. 26 was excluded from the relation among the vertical drive elements 4201z, 4202z, 4203z and the regions A, B, C, D. The concept of the present invention is not limited to the relation as explained, but may be similarly well applicable to a case of provision of the drive element 4204z of FIG. 26 instead of either one of the elements 4201z, 4202z, 4203z. It can be also applied to a case of inclusion of four vertical drive elements 4201z, 4202z, 4203z, 4204z, in which one of them is driven depending on the other three elements.

As explained, a flexure amount of each cantilever is detected while making the recording medium 4107 approach the probe electrodes. With the detection of flexure amount of cantilever, a spacing and an inclination between the multi-cantilever support member 4109 and the recording medium 4107 are adjusted by the vertical drive elements 4108. Consequently, the acting forces are kept acting between all the probe electrodes and the recording medium, and the dispersion of amplitude of the acting forces may be kept within a certain range. In the aforementioned case where the elastic constant of cantilevers is 0.01 N/m and the dispersion of tip height of the probe electrodes is 1 µm, the range of the dispersion of acting forces is 0.01 N/m×1 µm=$10^{-8}$N. In order to make the dispersion of amplitude of the forces acting between the respective probe electrodes and the recording medium smaller, the elastic constant of the cantilevers should be reduced for example by increasing a length of levers or by decreasing a film thickness of levers.

In the present embodiment as explained, an elastic member with an elastic constant smaller than that of the recording medium surface is used as the member supporting the respective probe electrodes, whereby the dispersions of shape and dimensions among the respective probe electrodes due to errors in process may be absorbed by deformation of elastic member caused by forces working between the recording medium and the respective probe electrodes while the entire probe electrodes are put together close to the recording medium. By this, without an extra circuit for controlling the spacing between each probe electrode and the medium, all the probe electrodes may be made to approach the recording medium, and the forces working between the recording medium and the probe electrodes may be kept below a certain level. In other words, during the approach of the plural probe electrodes to the recording medium, the forces working between the respective probe electrodes and the recording medium may be confined within a certain range, and the size of the range may be made smaller. Accordingly, even if materials for the recording medium and the probe electrodes are susceptible of breakdown or rupture with a force working between the recording medium and the probe electrodes, the force may be restricted below a break-down point of material by the above-described method using the cantilevers with an elastic constant smaller than that of the recording medium, avoiding breakdown during recording or reproducing.

A recording method is next explained with the probe electrodes 4101a, 4101b, 4101c, ... approaching the recording medium 4107 as above described. A horizontal position control signal is supplied from the position control circuit 4120 to the horizontal drive elements 4110 to move the probe electrode tips to a desired position to be recorded on the recording medium 4105. A recording voltage signal from the recording voltage application circuit 4111 is applied to a probe electrode selected by the switching circuit 4112. The recording medium used is one which can change a local shape thereof with application of localized voltage, with application of electric field, or with electric current. For example, materials usable for the recording medium are metals or metal compounds as described in Japanese Patent Application Laid-Open No. 1-312753, specifically, Au or Al. In addition, they include Rh—Zr alloys, Te—Ti alloys, Te—Se alloys, semiconductor thin films such as amorphous silicon, etc., as described in Staufer et al., Appl. Phys. Lett. 51., p. 244 (1987). Materials usable for the probe electrode are tungsten, Pt—Ir, Pt, and so on. A graphite may be employed using the etching method with application of pulse voltage to a graphite surface as described in Albrecht et al., Appl. Phys. Lett. 55., 1727–1729 (1989).

In the above-described example of the probe electrodes and the recording medium, the threshold level of breakdown for the force acting between the probe electrodes and the recording medium is about $10^{-6}$N. Accordingly, if the dispersion of the plural probe electrode tip heights as described is 1 μm, the cantilevers supporting the respective probe electrodes should be chosen to have an elastic constant smaller than about 0.5 N/m to avoid break-down with a force working between the probe electrodes and the recording medium while the plural probe electrodes are put close to the recording medium and are scanned for recording or reproducing. Then a force working between the recording medium and a probe electrode drops below $10^{-6}$N.

Next explained is a method for reproducing information recorded as a local change in shape of the recording medium. An optical beam from the laser beam source 4114 is condensed by the lens 4115, and the condensed laser beam is incident on the rotating polygon mirror 4116. The polygon mirror 4116 is controlled in rotation speed by the rotation speed control circuit 4117. As the polygon mirror 4116 rotates, the optical beam reflected thereby scans back faces of the plural cantilevers 4101a, 4101b, 4101c, .... A mirror surface of the polygon mirror 4116 is inclined with respect to a line vertical to the sheet plane of FIG. 25, that is, the polygon mirror is rotated about an axis M as shown in FIG. 25, whereby the cantilevers aligned in the direction of line vertical to the sheet plane may be scanned as well as the cantilevers arranged in the horizontal direction on the sheet plane as shown in FIG. 25. The position detection element 4118 detects a position of optical beam reflected by a back face of a cantilever. In case that a length of cantilever is t, that a distance is L between a cantilever back face and the position detection element, and that a flexure of cantilever tip is $\Delta Z$, a position of laser beam spot reflected by the cantilever back face is deviated on the position detection element 4118 by a distance of $(2L/t)\Delta Z$. A flexure amount of a cantilever tip may be obtained by detecting the positional deviation of the beam spot by the position detection signal processing circuit 4119 based on the signal from the position detection element 4118. Scanning the optical beam by the polygon mirror 4116, flexure amounts $\Delta Za$, $\Delta Zb$, $\Delta Zc$, ... of respective tips of the plural cantilevers 4101a, 4101b, 4101c, ... may be detected with time-division based on the signals from the rotation speed control circuit 4117.

While the surface of recording medium 4107 is two-dimensionally scanned with the plural probe electrodes 4104a, 4104b, 4104c, ... and if a probe electrode reaches a recording position (a bit position of shape changed), a force varies which the probe electrode receives from the recording medium due to the local change of shape, so that the flexure amount of the cantilever supporting the probe electrode changes. This change in flexure amount may be sequentially detected with time-division at the plural cantilevers, whereby recording bits two-dimensionally arranged for the respective probe electrodes are sequentially detected or reproduced.

The methods for putting the plural probe electrodes close to the recording medium in the twelfth embodiment may be replaced with the apparatus as shown in FIG. 2 by detecting currents or tunnel currents instead of the acting forces.

What is claimed is:

1. An information recording/reproducing apparatus for effecting, through a probe electrode, at least one of recording of information on and reproducing information from an information recording medium, an electrical characteristic of which varies by applying a voltage, said apparatus comprising:

a probe electrode;

an elastic member for supporting said probe electrode;

adjusting means for adjusting a spacing between said probe electrode and the recording medium so as to produce a repulsive force between said probe electrode and the recording medium;

means for effecting a relative movement between said probe electrode and the recording medium such that said probe electrode scans a surface of the recording medium under a state in which said elastic member is elastically deformed by said repulsive force;

voltage applying means for applying, between said probe electrode and the recording medium, voltages different upon recording the information and upon reproducing the information; and current detection means for detecting current generated between said probe electrode and the recording medium, wherein the recording of information is effected by applying the voltage for recording in accordance with the information and forming a region on the recording medium in which the electric characteristic is changed, and the reproducing of the information recorded on the recording medium is effected by detecting a variation of the current on the basis of the region on the recording medium in which the electric characteristic is changed by said current detection means while applying the voltage for reproducing which is smaller than the voltage for recording.

2. An information recording/reproducing apparatus according to claim 1, wherein said elastic member has an elastic constant of not more than 0.5 N/m, and wherein said adjusting means adjusts the spacing between said probe electrode and the recording medium such that the repulsive force of not more than $10^{-6}$N is generated between said probe electrode and the recording medium.

3. An information recording/reproducing apparatus for effecting, through a plurality of probe electrodes, at least one of recording of information on and reproducing information from an information recording medium, said apparatus comprising:

a plurality of probe electrodes for at least one of recording and reproducing information;

support means for integrally supporting said plurality of probe electrodes in parallel facing the recording medium;

adjusting means for adjusting a spacing between the recording medium and said support means;

displacing means for independently displacing each of said plurality of probe electrodes so as to independently adjust a spacing between the recording medium and a tip of each probe electrode; and control means for controlling said displacing means such that all spacings between the recording medium and said respective probe electrode tips are made equivalent, and for controlling said adjusting means such that, upon the control of said displacing means, an average of displacement amounts of said plurality of probe electrodes is substantially zero.

4. An information recording/reproducing apparatus according to claim 1, wherein a plurality of probe electrodes and a plurality of elastic members are provided.

* * * * *

UNITED STATES PATENT AND TRADEMARK OFFICE
CERTIFICATE OF CORRECTION

PATENT NO. : 5,461,605

DATED : October 24, 1995

INVENTOR(S) : Takimoto et al.

It is certified that error appears in the above-indentified patent and that said Letters Patent is hereby corrected as shown below: Title page

At [54] Title of the Invention

Delete the erroneous title, and replace it with

-- Information Recording/Reproducing Method, Recording Carrier And Apparatus For Recording And/Or Reproducing Information On Information Recording Carrier By Use Of Probe Electrode--

At [56] FOREIGN PATENT DOCUMENTS

Insert --0334677 09/1989 European Pat. Off.--; and
--4018308 12/1991 Germany.--.

At [56] OTHER PUBLICATIONS

Insert --"Surface Force Measurements on Picometer and Piconewton Scales", P. J. Bryant, et al., Journal of Vacuum Science & Technology, Part A, pp. 3502-3505, Vol. 8, No. 4, 1990, July/August, New York, U.S.--;

--"Simultaneous Imaging of Graphite Surface with Atomic Force/Scanning Tunneling Microscope", Yasuhiro Sugawara, et al., Japanese Journal of Applied Physics, pp. 1539-1543, Vol. 29, No. 8, August 1990, Part 1, Tokyo, Japan.--; and --"Anomalous Force Dependence of AFM Corrugations Height of a Graphite Surface in Air", Tatsuya Ishizaka, et al., Japanese Journal of Applied Physics, pp. L1196-L1198, Vol. 29, No. 7, July 1990, Tokyo, Japan.--.

UNITED STATES PATENT AND TRADEMARK OFFICE
CERTIFICATE OF CORRECTION

PATENT NO. : 5,461,605
DATED : October 24, 1995
INVENTOR(S) : Takimoto et al

Page 2 of 4

It is certified that error appears in the above-indentified patent and that said Letters Patent is hereby corrected as shown below:

At [56] U.S. PATENT DOCUMENTS

"5,015,850 8/1991 Zdeblick et al." should read --5,015,850 5/1991 Zdeblick et al.--.

Column 1

Lines 1-7, delete the erroneous title and replace it with --INFORMATION RECORDING/REPRODUCING METHOD FOR RECORDING AND/OR REPRODUCING INFORMATION ON INFORMATION RECORDING CARRIER BY USE OF PROBE ELECTRODE, INFORMATION RECORDING/REPRODUCING APPARATUS EXECUTING THE METHOD, AND INFORMATION RECORDING CARRIER SUITABLE FOR THE METHOD--; and
Line 26, "Conventionally" should read --Conventionally,--.

Column 7

Line 65, "aligner 8" should read --aligner 6--.

Column 8

Line 63, "is" should read --are--.

Column 11

Line 39, " $\overset{\oplus}{HN}(CH_3)_2$ | $(CH_2)_{15}CH_3$ " should read -- $\overset{\oplus}{HN}(CH_3)_2$ | $(CH_2)_{15}CH_3$ --;

Line 45, "1 x 10⁻" should read --1 x $10^{-3}$M.--; and
Line 46, "3M." should be deleted.

UNITED STATES PATENT AND TRADEMARK OFFICE
CERTIFICATE OF CORRECTION

PATENT NO. : 5,461,605
DATED : October 24, 1995
INVENTOR(S) : Takimoto et al

It is certified that error appears in the above-indentified patent and that said Letters Patent is hereby corrected as shown below:

Column 12

Line 39, " $\overset{\oplus}{HN}(CH_3)_2$ " should read -- $\overset{\oplus}{HN}(CH_3)_2$ --.
$(CH_2)_{15}CH_3$  $(CH_2)_{15}CH_3$

Column 15

Line 15, "pollshed" should read --polished--.

Column 16

Line 17, "the" (second occurrence) should be deleted.

Column 18

Line 4, "It" should read --it--.

Column 19

Line 49, "e." should read --c.--.

Column 23

Line 55, "e." should read --c.--.

Column 35

Line 50, "third" should read --thirdly--; (both Occurrences)
Line 51, delete "14"; and
Line 58, "third 14" should read --thirdly--.

UNITED STATES PATENT AND TRADEMARK OFFICE
CERTIFICATE OF CORRECTION

PATENT NO. : 5,461,605
DATED : October 24, 1995
INVENTOR(S) : Takimoto et al

It is certified that error appears in the above-indentified patent and that said Letters Patent is hereby corrected as shown below:

Column 39

Line 19, "apparatus for" should read --apparatus according to claim 1, wherein said adjusting means moves the recording medium.--; and Lines 20-24 should be deleted.

Column 40

Lines 1-19 should be deleted.

Signed and Sealed this

Second Day of July, 1996

Attest:

BRUCE LEHMAN

*Attesting Officer*     *Commissioner of Patents and Trademarks*